US011172001B1

(12) United States Patent
Puthucode Krishnamoorthy et al.

(10) Patent No.: US 11,172,001 B1
(45) Date of Patent: Nov. 9, 2021

(54) ANNOUNCEMENT IN A COMMUNICATIONS SESSION

(71) Applicant: Amazon Technologies, Inc., Seattle, WA (US)

(72) Inventors: Vaidyanathan Puthucode Krishnamoorthy, Seattle, WA (US); Tony Roy Hardie, Seattle, WA (US); Rohit Lohani, Sammamish, WA (US); Roopali Vasant Kaujalgi, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/365,476

(22) Filed: Mar. 26, 2019

(51) Int. Cl.
| *H04L 29/06* | (2006.01) |
| *H04M 3/42* | (2006.01) |
| *G10L 13/08* | (2013.01) |
| *H04M 9/08* | (2006.01) |
| *G10L 15/22* | (2006.01) |

(52) U.S. Cl.
CPC .......... *H04L 65/1069* (2013.01); *G10L 13/08* (2013.01); *G10L 15/22* (2013.01); *H04M 3/42042* (2013.01); *H04M 3/42076* (2013.01); *H04M 3/42204* (2013.01); *H04M 9/085* (2013.01); *H04L 65/403* (2013.01)

(58) Field of Classification Search
CPC ... H04L 65/403; H04L 67/025; H04L 67/125; H04L 67/22; H04L 2012/2849; H04L 12/1818; H04L 12/1822; H04L 51/02; H04L 12/282; H04L 65/1069; H04W 12/003; H04N 21/42203; H04N 21/4532; H04M 3/42204; H04M 3/42042; H04M 3/42076; H04M 9/085; G10L 13/08; G10L 15/22
See application file for complete search history.

(56) References Cited

U.S. PATENT DOCUMENTS

| 10,127,908 B1 | 11/2018 | Deller et al. |
| 10,339,957 B1 * | 7/2019 | Chenier ................ G10L 17/005 |
| 10,540,976 B2 | 1/2020 | Van Os et al. |
| 2014/0278438 A1 | 9/2014 | Hart et al. |
| 2015/0026580 A1 | 1/2015 | Kang et al. |
| 2015/0154976 A1 | 6/2015 | Mutagi |

(Continued)

OTHER PUBLICATIONS

Mat Honan, "Amazon's New Echo Show Is Very Cool and A Little Creepy", Jun. 26, 2017 (Year: 2017).*

*Primary Examiner* — Jungwon Chang
(74) *Attorney, Agent, or Firm* — Kilpatrick Townsend & Stockton LLP

(57) ABSTRACT

Techniques for announcing a communications session after the communications session is established between multiple user devices are described. In an example, a computer system may instruct a first user device to establish a communications session with a second user device. The computer system may receive, from the second user device, data indicating a request of the first user device for the communications session. Based at least in part on the data, the computer system may generate content associated with the first user device. The computer system may also instruct the second user device to accept the request and present the content after the communications session is established between the first user device and the second user device.

20 Claims, 11 Drawing Sheets

(56) References Cited

U.S. PATENT DOCUMENTS

| | | | | |
|---|---|---|---|---|
| 2018/0007210 | A1* | 1/2018 | Todasco | H04M 3/53333 |
| 2018/0047394 | A1* | 2/2018 | Tian | G01S 5/00 |
| 2018/0288104 | A1* | 10/2018 | Padilla | G10L 15/22 |
| 2019/0037172 | A1* | 1/2019 | Choi | H04W 4/16 |
| 2019/0149584 | A1* | 5/2019 | DiBello | H04N 21/8126 |
| | | | | 709/204 |
| 2019/0198008 | A1* | 6/2019 | Guo | G10L 15/22 |
| 2019/0235832 | A1* | 8/2019 | Pallakoff | G06F 3/0482 |
| 2019/0281387 | A1* | 9/2019 | Woo | G10L 21/055 |
| 2020/0105259 | A1* | 4/2020 | Lin | H04N 21/20 |

* cited by examiner

ANNOUNCEMENT IN A COMMUNICATIONS SESSION

BACKGROUND

As voice recognition technology improves, systems that employ such technology continue to proliferate. Some systems employ what is referred to as near-field voice recognition where a user speaks into a microphone located on a hand held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used for audio and video communications with other devices.

BRIEF DESCRIPTION OF THE DRAWINGS

Various embodiments in accordance with the present disclosure will be described with reference to the drawings, in which.

DETAILED DESCRIPTION

Figure 1:
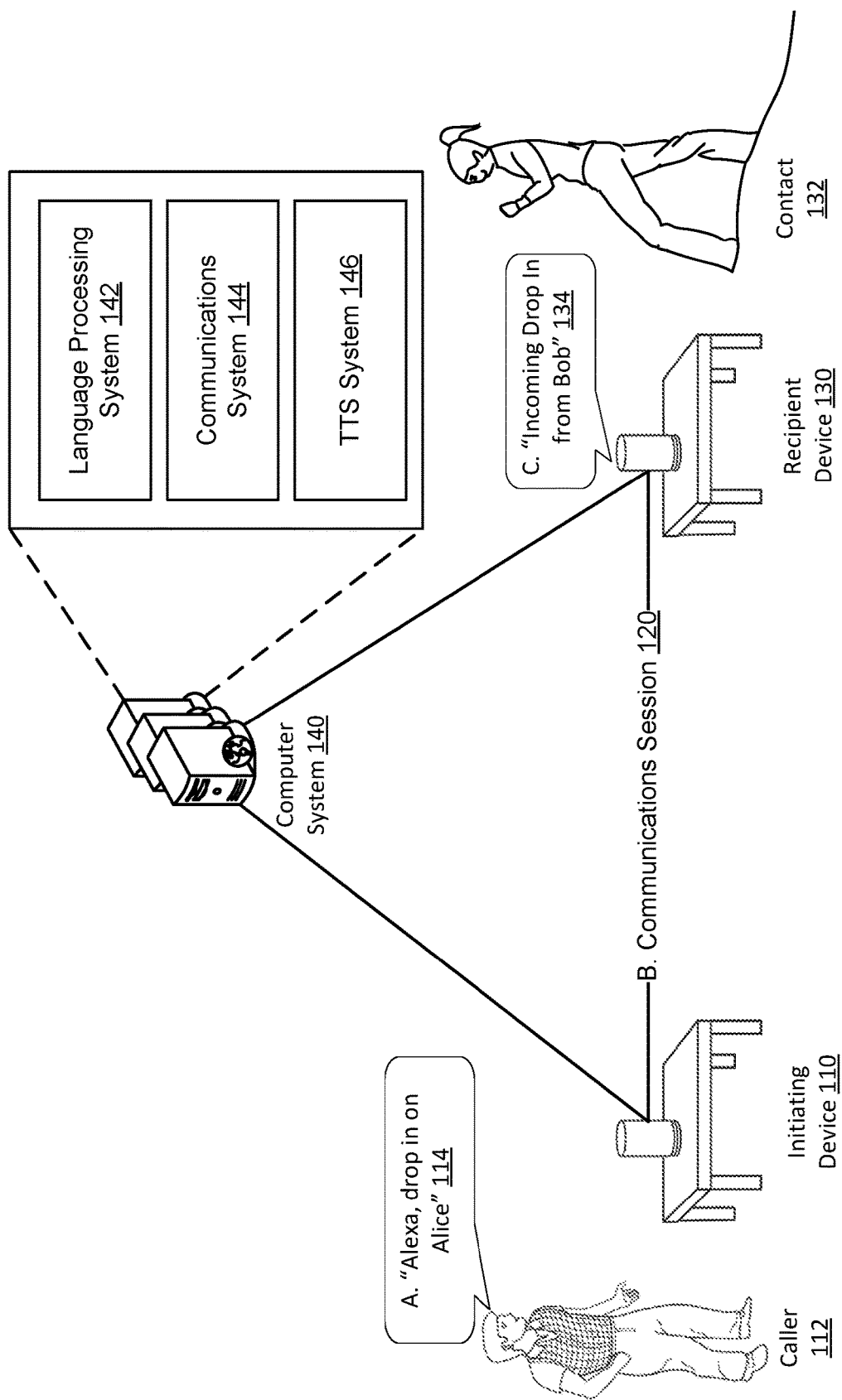
FIG. 1 illustrates an example communications session between user devices and an example announcement relevant to the communications session, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed, among other things, to announcing information about a communications session after the communications session is established between multiple user devices. In an example, a computer system supports a capability of an automatically established communications session between a first user device and a second user device (also referred to herein as an initiating device and a recipient device, respectively) based on a preset permission to establish the communications session without a user action at the second user device to manually accept the communications session. In this example, a first user operates the first user device (also referred to herein as a caller) to request a particular type of communications with a second user represented by contact data in a user profile associated with the first user. The computer system determines that the second user profile is associated with the second user device and that the particular type corresponds to the communications session that can be automatically established (e.g., established without user interaction at the recipient device). For example, the computer system instructs the first user device to establish the communications session with the second user device. In response to a request for the communications session from the first user device, the second user device sends data to the computer system indicating that the request was made. In turn, the computer system generates content, such as an audio and/or video file identifying the initiating party (e.g., the first user and/or the first user device), and instructs the second user device to accept the request and present the content thereafter. Accordingly, the communications session is automatically established between the two user devices and the second user device immediately thereafter presents the content, thereby announcing to the second user that the communications session was established with the initiating party. Among other benefits, this can be used to let the recipient know who is calling and/or that a communications session has been established without the recipient needing to take any action to establish the communications session.

To illustrate, consider an example of a caller operating a first voice-controlled device (VCD) to communicate with a contact that has a second VCD. A VCD can represent a smart speaker providing an intelligent personal assistant service responsive to a wakeword (e.g. "Alexa") and capable of different communications tasks, including Drop Ins. A "Drop In" represents the capability of a recipient device (e.g., the VCD) to automatically establish a synchronous audio communications session without a user of the recipient device needing to manually accept the request to establish the communications session when there is a preset permission enabling automatic acceptance of the request (e.g., the VCD automatically accepts the Drop In on behalf of the user given the preset permission).

In the illustrative example, a computer system stores user accounts of the caller and contact and permissions for Drop Ins. Upon an utterance of the caller to drop in on the contact (e.g., "Alexa, drop in on Alice"), the computer system receives audio data representing the utterance from the first VCD. By performing spoken language processing, the computer system determines that the caller requested a Drop In on the contact. The computer system looks up a contacts list under the caller's user account (the user account identified from, e.g., a unique identifier from the first VCD and/or speaker identification component), finds the contact (e.g. Alice) and identifies the second VCD that is associated with this contact. In addition, the computer system determines from the contact's user account that the Drop In is permitted from the caller's user account. Accordingly, the computer system instructs the first VCD to establish a synchronous audio communications session with the second VCD, where the instructions include relevant data for the Drop In (e.g., a network address of the second VCD). Next, the first VCD requests the second VCD to establish the synchronous audio communications session therewith and the second VCD sends event data about this request to the computer system. The event data can include an identifier of the first VCD. In response, the computer system matches the first VCD's identifier with a name (e.g., Bob) in a contacts list under the contact's user account and generates a text-to-speech (TTS) content that announces a Drop In from the name (e.g., "Bob has initiated a Drop In"). The computer system stores the TTS content as a file in a data store and instructs the second VCD to establish the synchronous audio communications session with the first VCD, to stream the TTS content after the synchronous audio communications session, and to pause the presentation of any inbound audio data from the first VCD and the transmission of any outbound audio data from the second VCD. Accordingly, the second VCD accepts the Drop In from the first VCD, plays the TTS content (thereby announcing to the contact—Alice—that "Bob has initiated a Drop In"), and once the presentation of the TTS content is complete, presents audio data of the caller and transmits audio data of the contact in the synchronous audio communications session.

The above example is provided for illustrative purposes and the embodiments of the present disclosure are not limited as such. Instead, the embodiments similarly apply to communications sessions between multiple user devices. For instance, different types of communications sessions can be supported, including synchronous communications sessions and asynchronous communications sessions that support audio, video, text, and/or multimedia (e.g., file sharing) data exchange. Such communications sessions can be automatically accepted based on preset permissions or may necessitate a manual acceptance. In addition, the communications sessions can support conference and/or group communications. Generally, a computer system receives a request for a type of communications, determines the relevant data about the involved user devices (e.g., network addresses, identifiers of the users associated with the user devices, etc.), generates content for announcing the communications, instructs the user devices to establish one or more communications sessions of the requested type, and instructs one or more of the user devices to present the content after at least a communications session is established.

Embodiments of the present disclosure provide various technical advantages over existing systems. For example, by establishing a communications session first and then presenting content relevant to announcing incoming communications from one or more particular parties, the latency between a caller's request for the type of communications and the communications session being established between the user devices is reduced. Further, because the contact is notified of the incoming communications in a timely manner, the overall user experience can be maintained (e.g., relative to systems that would notify the user before the communications session is established) or even improved (e.g., relative to systems that would not provide such notifications).

In the interest of clarity of explanation, various embodiments of the present disclosure are described in connection with Drop Ins from an initiating device to a recipient device. However, and as explained herein above, the embodiments of the present disclosure are not limited as such.

FIG. 1 illustrates an example communications session between user devices and an example announcement relevant to the communications session, in accordance with various embodiments. As illustrated, an initiating device 110 establishes a communications session 120 with a recipient device 130. Thereafter, the recipient device 130 announces that the communications session 120 was established. A computer system 140 manages the communications session 120 and instructs the recipient device 130 about the announcement.

A caller 112 and a contact 132 operate the initiating device 110 and the recipient device 130, respectively. In the illustrative example of FIG. 1, each of the initiating device 110 and the recipient device is a VCD that responds to a wakeword (e.g., Alexa). Upon a proper utterance 114 of the caller 112 about a Drop In on the contact 132 as represented by contact data in a user profile associated with the caller 112 (e.g., "Alexa, drop in on Alice," where Alice corresponds to the contact 132), the computer system 140 receives audio data representing the utterance from the initiating device 110. The computer system 140 includes a natural language processing system 142 that determines, from the audio data, an intent of the caller 112 for a Drop In on the contact 132. The computer system 140 also includes a communications system 144 that determines, from the contact data, an identifier of the recipient device 130 and that instructs, based on preset permissions, the initiating device 110 and the recipient device 130 to establish the communications session 120. In this case, the communications session 120 is a synchronous communications session that facilitates audio data exchange between the initiating device 110 and the recipient device 130, where the audio data corresponds to dialogue of the caller 112 and the contact 132 and, potentially, other audio inputs. Further, the computer system 140 includes a TTS system 146 that generates an audio announcement 134 about the communications session 120 and the initiating party. This party can be the caller 112 and/or the initiating device 110. The computer system 140 instructs the recipient device 130 to present the audio announcement 134.

In an example, after the communications session 120 is established and prior to presenting any of the caller's 112 incoming audio data, the recipient device 130 presents the audio announcement 134. For instance, the audio announcement 134 is played over a speaker of the recipient device 130 and explains that a particular type of communications was established and identifies the initiating party (e.g., as illustrated "Incoming Drop In from Bob," where Bob corresponds to the caller 112; alternatively "Device XYZ initiated a Drop In" or "Bob's Device XYZ is connected," where XYZ corresponds to a profile name of the initiating device 110). In this example, the recipient device 130 pauses, while the audio announcement 134 is being presented, the presentation of any inbound audio data from the initiating device 110 to the recipient device 130 in the communications session 120 and the transmission of outbound audio data from the recipient device 130 to the initiating device 110 in the communications session 120. Once the presentation of the audio announcement 134 is completed, the recipient device 130 starts the presentation of inbound audio data and the transmission of outbound audio data in the communications session 120.

In another example, while the audio announcement 134 is presented, the inbound audio data is also presented, but the transmission of the outbound data is paused until the presentation of the audio announcement 134 is completed. In yet another example, the recipient device 130 presents both the audio announcement 134 and inbound audio data simultaneously and transmits the outbound audio data.

Generally, each of the initiating device 110 and the recipient device 130 can be any suitable user device that supports the type of communications session 120. For instance, the initiating device 110 and/or the recipient device 130 can be a smartphone, a tablet, a laptop, a personal computer, a VCD, a voice-controlled multimedia device (VCMD), a smart watch, a smart wearable device, a virtual reality (VR) headset, an augmented reality (AR) headset, a monitoring system (e.g., a video security system), a smart doorbell, and/or any other device with the hardware and software suitable for conducting a synchronous communications session. Further, the initiating device 110 need not be responsive to a wakeword and even if responsive, requesting the communications session 120 need not involve a user utterance 114. Instead, and for example, the communications application of the initiating device 110 may present the contact data of the contact 132 in a menu, and the caller 112 may select the contact data and request the Drop In from the menu via a touch screen, or any other input modality, of the initiating device 110. Depending on the input and output modalities of the initiating device 110 and the recipient device 130 and on the communications application, the communications session can support different types of communications, including synchronous and asynchronous audio, video, text, and multimedia communications. In such a case, the announcement presented by the recipient device 130 can include audio, video, text, and/or multimedia content as applicable.

In an illustration of a monitoring system, the recipient device 130 is a video camera that supports monitoring of a space remotely from user devices over a data network. In this illustration, the initiating device 110 may request remote monitoring of the space via the recipient device 130. Based on preset permissions, a synchronous video and, optionally, audio communications session may be automatically established with the initiating device 110 for the remote monitoring from the initiating device 110. Based on a setting associated with user accounts and/or device profiles, the computer system 140 may instruct the recipient device 130 to announce information about the remote monitoring (e.g., by announcing that the communications session was established and by identifying the initiating party). Such a setting can be updated over time based on a number of factors. For instance, a user (e.g., such as the operator of the initiating device 110) may have the authority to toggle the setting between enabling or disabling the announcement, where this toggling may be performed via a user interface. In addition, the setting may be updated to disable the announcement when the monitoring system is set to "away." Other usable factor relates to user presence, user activity, and/or device locations. For instance, the setting may specify that the announcement should be enabled if the number of persons detected from the video data exceeds a predefined threshold, if a person detected from the video data is performing an activity, and/or if the initiating device 110 is not located in the space. For instance, the monitoring system may be a baby monitoring system (or other home security system). In this case, the announcement is enabled when the whole family is home, the baby is not sleeping, and the initiating device 110 is at a location other than the home.

Figure 2:
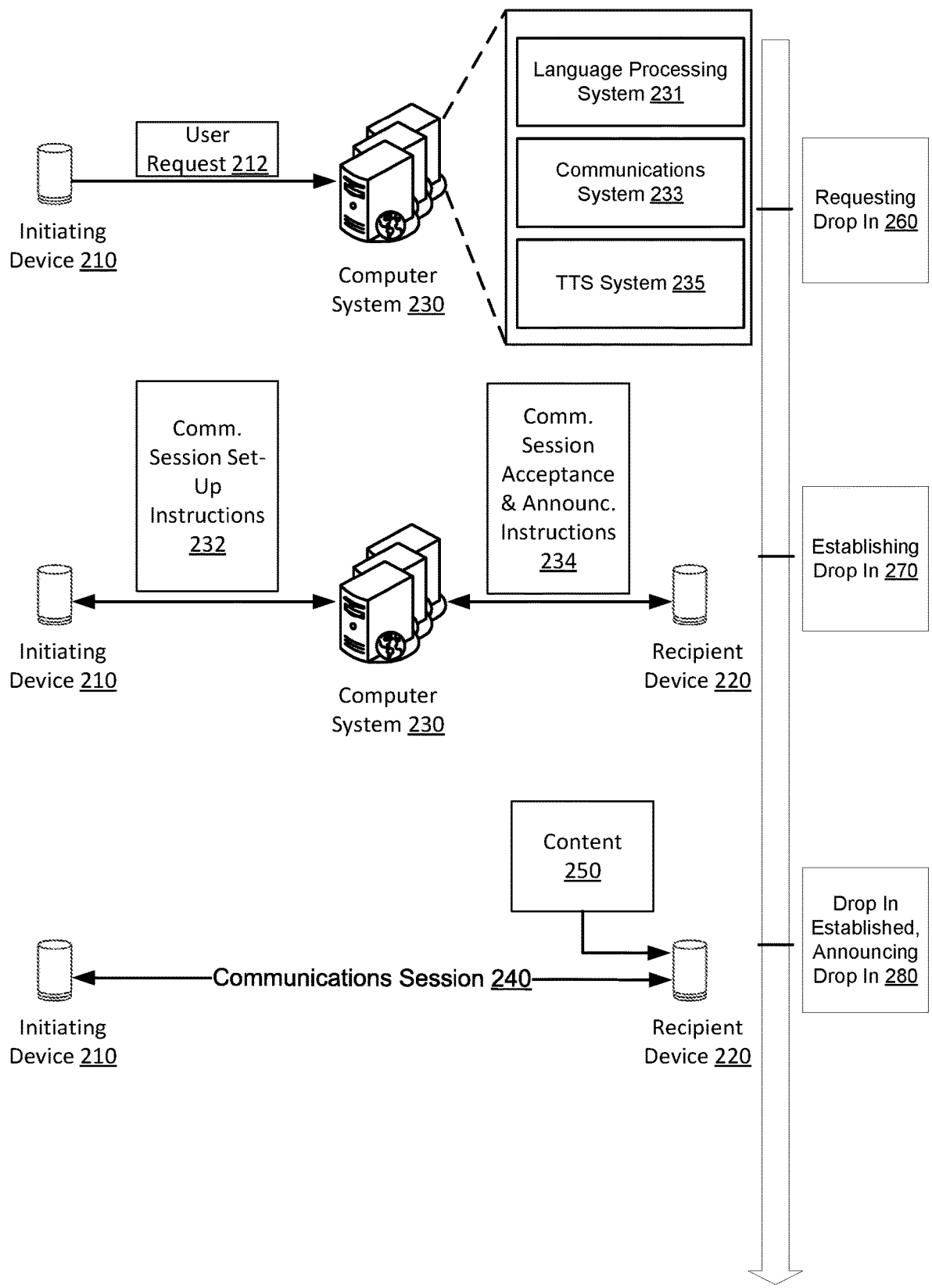
FIG. 2 illustrates an example network environment for communications between devices, in accordance with various embodiments.

FIG. 2 illustrates an example network environment for communications between devices, in accordance with various embodiments. As illustrated, the network environment includes an initiating device 210, a recipient device 220, and a computer system 230 communicatively coupled over one or more data networks (not shown in FIG. 2). The initiating device 210, the recipient device 220, and the computer system 230 are examples of the initiating device 110, the recipient device 130, and the computer system 140 of FIG. 1, respectively. A communications session 240 is established between the initiating device 210 and the recipient device 220 in multiple phases. First, the initiating device 210 requests 260 a type of communications (e.g., a Drop In) from the computer system 230. Next, the computer system 230 facilitates establishing 270 the communications session of the requested type (e.g., a synchronous audio communications session) by instructing the initiating device 210 and the recipient device 220. Once the communications session 240 is established, the recipient device 220 presents content 250 to announce 280 that the communications sessions 240 was established and to identify the initiating party.

In an example, the initiating device 210 receives a user utterance of a caller, where the user utterance includes a wakeword and requests a particular type of communications with a contact (e.g., "Alexa, drop in on Alice"). In this example, the initiating device 210 detects the wakeword (e.g., Alexa), and sends audio data about the uttered request (e.g., drop in on Alice) in a user request 212 to the computer system 230. In another example, the initiating device 210 receives a user selection at a user interface of the initiating device 210 for the particular type of communications with the contact. In this example, the initiating device 210 sends data about the user selection (e.g., data explicitly identifying the contact and the type of communications) in the user request 212 to the computer system 230. Generally, the user request 212 according to a session initiation protocol (SIP) in a communications session between the initiating device 210 and the computer system 230.

Next, the computer system 230 facilitates the establishing 270 of the communications session. In an example, the computer system 230 is implemented as a set of computer servers or set of virtual instances hosted on computer hardware and includes a language processing system 231, a communications system 233, and a TTS system 235, as further described in connection with FIG. 3. When the user request 212 is generated based on a user utterance, the language processing system 231 is used to identify the intent of the caller (e.g., a Drop In) and the contact (e.g., Alice) and this data is provided to the communications system 233. Otherwise, the data from the user request 212 is directly provided to the communications system 233.

Upon receiving the audio data of the user request 212, the language processing system 231 may apply automatic speech recognition (ASR) processing to the audio data to generate text data. ASR processing can also perform speech identification analysis to the audio data in an attempt to identify the individual speaking (which can be used to look-up their user account and contacts under their user accounts). The text data can be provided for natural language understanding (NLU) processing that analyzes the text data in order to determine the intent of the spoken utterance, which can be provided as intent data. Using text data representing the received audio data, NLU processing may compare the structure of the utterance to various sample utterances in an attempt to match the spoken utterance to one of the sample utterances. For example, NLU processing may determine that the user utterance has a format of "{Wakeword}, {Start Communications Session}{Contact Name}," and may identify the elements of utterance based on the determined format. For instance, the NLU processing may determine that the intent of this utterance is for a Drop In to be started with one of the caller's contacts having the name "Alice."

The communications system 233 may determine a contact named Alice from a user account associated with the caller. The caller's user account may be determined in different ways. For instance, the user account may correspond to the account under which the initiating device 210 is registered. In another illustration, the caller may be identified based on the ASR processing and the caller's identifier may be used to find the caller's user account. The user account may include a contacts list identifying Alice as a contact and including a unique identifier of the recipient device 220 (e.g., its media access control (MAC) address). If this contact is associated with multiple recipient devices, the communications system 233 may select the recipient device 220 based on presence information related to the contact.

In particular, if the presence information indicates that the contact is most likely in proximity of the recipient device 220 rather than the other recipient devices, the communications system 233 selects this recipient device 220. Different types of presence information are possible including current use information, most recent use information, most frequent use information, and user preferences. For instance, if the recipient device 220 is currently in use, was the most recently used, is most frequently used, and/or is the preferred device of the contact, the communications system 233 may select it accordingly.

In another example, the user utterance of the caller identifies the recipient device instead of the contact (e.g., the utterance is for "Alexa, drop in on Device ABC"). Here, a similar processing may be applied to determine the unique identifier of the recipient device 220 from the contacts list under the caller's user account.

Upon identifying the recipient device 220, the communications system 233 may identify the contact's user account and determine, from this user account, whether a preset permission exists to allow the requested type of communications (e.g., to determine whether Drop Ins are allowed). If so, the communications system 233 sends communications set-up instructions 232 to the initiating device 210. The communications set-up instructions 232 include relevant data that allows the initiating device 210 to initiate the communications session 240 with the recipient device 220, such as the recipient device's 220 unique identifier and/or network address (e.g., internet protocol (IP) address). Upon receiving event data from the recipient device 220 indicating that the communications session was requested and identifying the initiating device 210 (e.g., by including a unique identifier of the initiating device 210 in the event data), the communications system 233 sends information identifying the initiating party to the TTS system 235. In turn, the TTS system 235 generates and stores the content 250 in a data store and responds. The communications system 233 receives information about the content 250 (e.g. its URL) from the TTS system 235 and responds, to the recipient device 220, with communications session acceptance and announcement instructions 234. These instructions 234 may include the URL of the content 250 and instruct the recipient device 220 to establish the communications session 240 with the initiating device 210 and present the content 250 once the communications session 240 is established. The announcement instruction 234 can also instruct the initiating device 210 about the timing of presenting the content 250 (e.g., immediately after the communications session 240 is established) and about the presentation of incoming audio data from the initiating device 210 and the transmission of the outbound audio data from the recipient device 220 while the content 250 is being presented.

In an example, the communications system 233 uses the unique identifier of the initiating device 210 from the event data (e.g., its MAC address) to look up the contacts list of the contact's user account and determine a profile name of the initiating device 210. Alternatively or additionally, the communication system 233 determines from this contacts list the name of the caller. The content 250 can be generated by the TTS system 235 as a TTS audio that includes either or both the profile name of the initiating device 210 and the name of the caller. In addition, other content related to the initiating device 210 and/or the caller (e.g., images, graphics, videos, etc.) can be retrieved from the contact's user account and added to the content 250.

Figure 3:
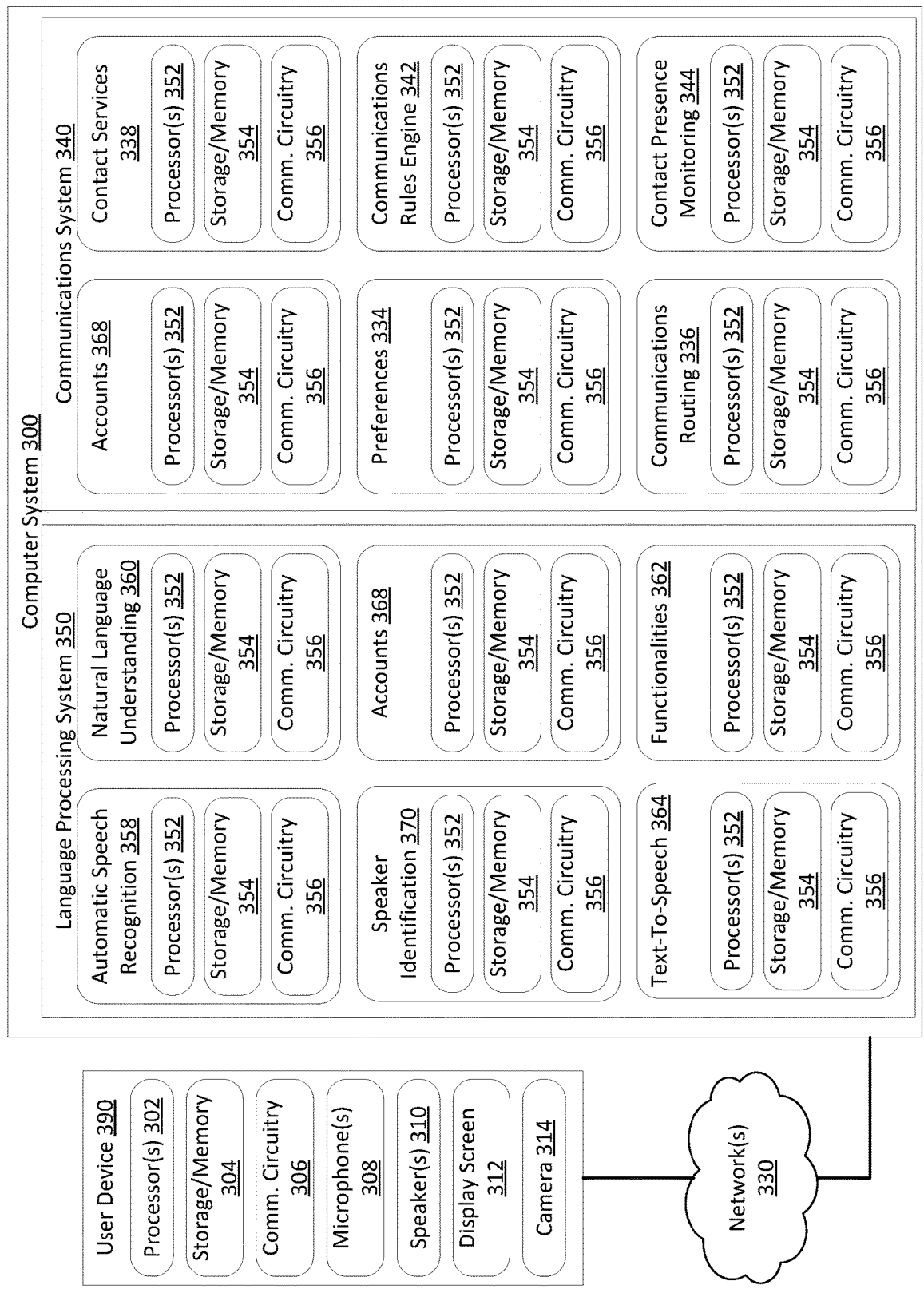
FIG. 3 illustrates an example system architecture of FIG. 2, in accordance with various embodiments.

FIG. 3 illustrates an example system architecture of FIG. 2, in accordance with various embodiments. As illustrated, a user device 390 may be configured to communicate with a computer system 300, and in particular with a language processing system 350, in response to detecting an utterance including a wakeword, which may subsequently be followed by a request/question/statement. Similarly, the user device 390 may alternatively or additionally include one or more manually activated components for manually activated capabilities. In this particular scenario, the user device 390 may also be configured, in some embodiments, to communicate with the language processing system 350, in response to a manual input being detected by one or more input mechanisms, such as a touch screen, a button, and/or a switch, for example. The computer system 300 is one example of the computer system 230 of FIG. 2. The user device 390 is usable to initiate and receive communications. When initiating communications, the user device 390 represents an example of the initiating device 210 of FIG. 2. When receiving communications, the user device 390 represents an example of the recipient device 220 of FIG. 2.

In non-limiting embodiments, the user device 390 may be capable of being activated in response to detecting a specific sound, such as a wakeword. After detecting a specific sound (e.g., a wakeword or trigger expression), the user device 390 may recognize commands (e.g., audible commands, inputs) within captured audio, and may perform one or more actions in response to the received commands. Furthermore, the user device 390 may also be configured to perform one or more actions in response to detecting a particular touch, or mechanical, input(s) via the user device 390.

The user device 390 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices, personal digital assistants ("PDAs"), VCDs, VCMDs, monitoring systems, gaming consoles and/or devices, smart furniture, smart household devices (e.g., refrigerators, microwaves, doorbells, etc.), smart vehicles (e.g., cars, trucks, motorcycles, etc.), smart transportation devices (e.g., ships, trains, airplanes, etc.), wearable devices (e.g., watches, pins/broaches, headphones, VR headsets, AR headsets, etc.), and/or smart accessories (e.g., light bulbs, light switches, electrical switches, etc.). In some embodiments, the user device 390 may be relatively simple or basic in structure such that no, or a minimal number of, mechanical input option(s) (e.g., keyboard, mouse, track pad) or touch input(s) (e.g., touch screen, buttons) are included. For example, the user device 390 may be able to receive and output audio, and may include power, processing capabilities, storage/memory capabilities, and communication capabilities. However, in other embodiments, the user device 390 may include one or more components for receiving mechanical inputs or touch inputs, such as a touch screen and/or one or more buttons.

The user device 390, in some embodiments, may include a minimal number of input mechanisms (e.g., a power on/off switch) such that functionality of the user device 390 may solely or primarily be through audio input and audio output. For example, the user device 390 may include, or be in communication with, one or more microphones that listen for a wakeword by continually monitoring local audio. In response to the wakeword being detected, the user device 390 may establish a connection with the language processing system 350 (such as through a network(s) 330), send audio data to the language processing system 350, and await/receive a response from the language processing system 350. In some embodiments, however, non-voice/sound activated devices may also communicate with the language processing system 350 (e.g., push-to-talk devices). For example, in response to a button or touch screen being pressed, or a button or touch screen being pressed and held, a microphone associated with the user device 390 may begin recording local audio, establish a connection with the language processing system 350, send audio data representing the captured audio to the language processing system 350, and await/receive a response, and/or action to be occur, from the language processing system 350.

It may be recognized that although in the illustrative embodiment shown in FIG. 3, the computer system 300 includes the language processing system 350, this is merely exemplary, and the language processing system 350 may be separate from the computer system 300. For example, the language processing system 350 may be located within a dedicated computing device (such as one or more separate server(s), or within the user device 390) or computing system, which may or may not be in communication with the computer system 300 and/or one or more additional devices.

The user device 390 may include one or more processors 302, storage/memory 304, communications circuitry 306, one or more microphones 308 or other audio input devices (e.g., transducers), one or more speakers 310 or other audio output devices, a display screen 312, and one or more cameras 314 or other image capturing components. However, one or more additional components may be included within the user device 390, and/or one or more components may be omitted. For example, the user device 390 may also include a power supply or a bus connector. As still yet another example, the user device 390 may include one or more additional input and/or output mechanisms, such as one or more buttons, or one or more switches or knobs. Furthermore, while the user device 390 may include multiple instances of one or more components, for simplicity only one of each component has been shown.

In some embodiments, the user device 390 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, the user device 390 may be in communication with an additional processing device including one or more of: processor(s) 302, storage/memory 304, communications circuitry 306, microphone(s) 308, speaker(s) 310, display screen 312, and/or camera(s) 314. For example, a centralized control device of the user device 390 may include one or more microphone(s) 308. These microphone(s) 308 may receive audio input signals, which in turn may be sent to the language processing system 350 in response to a wakeword engine of the user device 390 determining that a wakeword was uttered.

The processor(s) 302 may include any suitable processing circuitry capable of controlling operations and functionality of the user device 390, as well as facilitating communications between various components within the user device 390. In some embodiments, the processor(s) 302 may include a central processing unit ("CPU"), a graphic processing unit ("GPU"), one or more microprocessors, a digital signal processor, or any other type of processor, or any combination thereof. In some embodiments, the functionality of the processor(s) 302 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of the processor(s) 302 may include its own local memory, which may store program systems, program data, and/or one or more operating systems. However, the processor(s) 302 may run an operating system ("OS") for the user device 390, and/or one or more firmware applications, media applications, and/or applications resident thereon. In some embodiments, the processor(s) 302 may run a local client script for reading and rendering content received from one or more websites. For example, the processor(s) 302 may run a local JavaScript client for rendering HTML or XHTML content received from a particular URL accessed by the user device 390.

The storage/memory 304 may include one or more types of storage mediums such as any volatile or non-volatile memory, or any removable or non-removable memory implemented in any suitable manner to store data for the user device 390. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the storage/memory 304 may be implemented as computer-readable storage media ("CRSM"), which may be any available physical media accessible by processor(s) 302 to execute one or more instructions stored within the storage/memory 304. In some embodiments, one or more applications (e.g., gaming, music, video, calendars, lists, etc.) may be run by the processor(s) 302, and may be stored in the memory 304.

In some embodiments, the storage/memory 304 may include a media system, which may be configured to facilitate communications between the user device 390 and the computer system 300. For example, the media system may store one or more communications protocols that may be executed by the processor(s) 302 for facilitating communications for the user device 390. In some embodiments, a sessions initiation protocol ("SIP") may be used to facilitate media transfer between the user device 390 and one or more of the computer system and a second user device 390. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for the user device 390. In some embodiments, a Web Real-Time Communications ("WebRTC") protocols may be employed by the user device 390. In a non-limiting embodiment, the media system may include instructions that indicate which communications protocols to employ for facilitating media transfer between devices based on a device type of the user device 390. For example, if the user device 390 does not include the display 312 and/or camera 314, the media system may indicate that PJSIP should be used, whereas if the user device 390 includes the display 312 and/or camera 314, the media system may indicate that WebRTC protocols should be used.

In some embodiments, the storage/memory 304 may include one or more systems and/or databases, such as a speech recognition system, a wakeword database, a sound profile database, and a wakeword detection system. The speech recognition system may, for example, include an automatic speech recognition ("ASR") component 358 that recognizes human speech in detected audio signals and converts the audio signals to text data. The speech recognition system may also include a natural language understanding ("NLU") component 360 that determines user intent based on the text data it receives from ASR. Also included within the speech recognition system may be a text-to-speech ("TTS") component 364 that is capable of converting text to speech to be outputted by the speaker(s) 310 in the user device 390, and/or a speech-to-text ("STT") component capable of converting received audio signals into text to be sent to the language processing system 350 for processing. The TTS component 364 is an example of the TTS system 235 of FIG. 2.

The wakeword database may be a database stored locally by the storage/memory 304 of the user device 390, and may include a list of a current wakewords for the user device 390, as well as one or more previously used, or alternative, wakewords for the voice activated user device 390. In some embodiments, an individual may set or program a wakeword for their user device 390. The wakeword may be programmed directly on the user device 390, or a wakeword or wakewords may be set by the individual via a local client application that is in communication with computer system 300 and/or language processing system 350. For example, an individual may use their mobile device having the speech-processing system application running thereon to set the wakeword. The specific wakeword may then be communicated from the mobile device to the language processing system 350, which in turn may send/notify the user device 390 of the individual's selection for the wakeword. The selected activation may then be stored in the wakeword database of the storage/memory 304. In some embodiments, additional trigger expressions or permutations of the wakeword may also be stored within the storage/memory 304. For example, specific trigger expressions or words that indicate the presence of the wakeword may also be stored within the storage/memory 304. In some embodiments, audio watermarks, indicating a specific action or message, may also be stored within the storage/memory 304.

In some embodiments, sound profiles for different words, phrases, commands, or audio compositions are also capable of being stored within the storage/memory 304, such as within a sound profile database. For example, a sound profile of audio may be stored within the sound profile database of the storage/memory 304 on the user device 390. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by the microphone(s) 308 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by the microphone(s) 308. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by the microphone(s) 308. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, the user device 390 may then begin transmitting the audio signal to the language processing system 350 for detecting and responds to subsequent utterances made by an individual.

In some embodiments, the storage/memory 304 may store voice biometric data associated with one or more individuals. For example, an individual that operates the user device 390 may have a registered user account on the computer system 300 (e.g., within accounts system 368). In some embodiments, the user device 390 may be associated with a group account, and various individuals may have user accounts that are operating under the rules and configurations of the group account. As an illustrative example, an initiating user device 390 (e.g., the initiating device 210 of FIG. 2) may be associated with a first group account on the computer system 300, the first group account being for a family that lives at a household where first shared electronic device is located. Each family member may also have a user account that is linked to the first group account (e.g., a parent, a child, etc.), and therefore each user account may obtain some or all of the rights of the first group account. For example, the user device 390 may have a first group account on the computer system 300 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Upon receiving audio data representing an utterance, a voice print of that audio data may be generated using speaker identification functionality stored within the storage/memory 304. The voice print of the utterance may indicate the different frequency components of the spoken words over time as the utterance was spoken. The generated voice print may then be compared to a previously generated voice print, which may be referred to as a reference voice print, specific to a particular individual's speech. A difference between the generated voice print and the reference voice print may be determined and, if the difference is less than or equal to a predefined threshold value, then the two voice prints may be declared as corresponding to a same individual's voice indicating that that individual spoke the utterance. If the difference is larger than the predefined threshold value, then the generated voice print may be said to be unassociated with the individual's voice, and therefore may indicate that the individual did not speak the utterance. In some embodiments, the speaker identification functionality may compare any generated voice print to one or more reference voice prints in order to try and find a match. Therefore, for each individual's user account associated with a group account, voice biometric data (e.g., a voice print) for that particular individual may be included. This may allow user device 390 to attempt and identify a speaker of a particular utterance locally. However, persons of ordinary skill in the art will recognize that the user device 390 may not perform speaker identification processing, and alternatively speaker identification processing may be performed by the computer system 300 (e.g., a speaker identification system 370), or no speaker identification processing may be performed all together.

The communications circuitry 306 may include any circuitry allowing or enabling one or more components of the user device 390 to communicate with one another, or with one or more additional devices, servers, and/or systems. For example, the communications circuitry 306 may facilitate communications between the user device 390 and the computer system 300. As an illustrative example, audio data representing an utterance may be transmitted over the network(s) 330, such as the Internet, to the computer system 300 using any number of communications protocols. For example, the network(s) 330 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between the user device 390 and the computer system 300. In some embodiments, the user device 390 and computer system 300 and/or one or more additional devices or systems (e.g., the language processing system 350) may communicate with one another via a web browser using HTTP. Various additional communication protocols may be used to facilitate communications between the user device 390 and computer system 300, including, but not limited to, Wi-Fi (e.g., 802.11 protocol), Bluetooth, radio frequency systems (e.g., 900 MHz, 1.4 GHz, and 5.6 GHz communications systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

The communications circuitry 306 may use any communications protocol, such as any of the previously mentioned exemplary communications protocols. In some embodiments, the user device 390 may include an antenna to facilitate wireless communications with a network using various wireless technologies (e.g., Wi-Fi, Bluetooth, radiofrequency, etc.). In yet another embodiment, the user device 390 may include one or more universal serial bus ("USB") ports, one or more Ethernet or broadband ports, and/or any other type of hardwire access port so that the communications circuitry 306 allows the user device 390 to communicate with one or more communications networks.

The user device 390 may also include one or more microphones 308 and/or transducers. Furthermore, one or more microphones located within a separate device may be in communication with the user device 390 to capture sounds for the user device 390. The Microphone(s) 308 may be any suitable component capable of detecting audio signals. For example, the microphone(s) 308 may include one or more sensors for generating electrical signals and circuitry capable of processing the generated electrical signals. In some embodiments, the microphone(s) 308 may include multiple microphones capable of detecting various frequency levels. As an illustrative example, the user device 390 may include multiple microphones (e.g., four, seven, ten, etc.) placed at various positions about the user device 390 to monitor/capture any audio outputted in the environment where the user device 390 is located. The various microphones 308 may include some microphones optimized for distant sounds, while some microphones may be optimized for sounds occurring within a close range of the user device 390. In some embodiments, the microphone(s) 308 may only begin to detect audio signals in response to a manual input to user device 390. For example, a manually activated device may begin to capture audio data using the microphone(s) 308 in response to a user input, such as pressing a button, tapping a touch screen, or providing any touch input gesture to a touch input component.

The user device 390 may include one or more speakers 310. Furthermore, the user device 390 may be in communication with one or more speaker(s) 310. The speaker(s) 310 may correspond to any suitable mechanism for outputting audio signals. For example, the speaker(s) 310 may include one or more speaker units, speaker housings, transducers, arrays of speakers, and/or arrays of transducers that may be capable of broadcasting audio signals and or audio content to a surrounding area where user device 390 may be located. In some embodiments, the speaker(s) 310 may include headphones or ear buds, which may be wirelessly wired, or hard-wired, to the user device 390, that may be capable of broadcasting audio directly to an individual.

In some embodiments, the one or more microphones 308 may serve as input devices to receive audio inputs. The user device 390, in the previously mentioned embodiment, may then also include the one or more speakers 310 to output audible responses. In this manner, the user device 390 may function solely through speech or audio, without the need for any input mechanisms or displays, however this is merely exemplary.

The display screen 312 may correspond to a display device and/or touch screen, which may be any size and/or shape and may be located at any portion of the user device 390. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, the display screen 312 may correspond to a projected capacitive touch ("PCT"), screen include one or more row traces and/or driving line traces, as well as one or more column traces and/or sensing lines. In some embodiments, the display screen 312 may be an optional component for the user device 390. For instance, the user device 390 may not include the display screen 312. Such devices, sometimes referred to as "headless" devices, may output audio, or may be in communication with a display device for outputting viewable content.

The display screen 312, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the display screen 312, a capacitance between the object and the conductive material may be formed. The processor(s) 302 may be capable of determining a location of the touch screen associated with where the capacitance change is detected, and may register a touch input as occurring at that location.

In some embodiments, the display screen 312 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the display screen 312 corresponding to where a conductive object contacted display screen 312.

A change in capacitance may be measured to determine a location on the touch screen where the object has contacted the surface. For example, if an individual touches a point on display screen 312, then a corresponding driving line and sensing line that intersect at that point may be identified. A location of the point may have one or more pixels associated with that location, and therefore one or more actions may be registered for an item or items that are displayed at that location. The processor(s) 302 of the user device 390 may be configured to determine which pixels are associated with a particular location point, and which item or items are also displayed at that pixel location. Furthermore, the user device 390 may be configured to cause one or more additional actions to occur to the item or items being displayed on the display screen 312 based on a temporal duration the touch input, and or if one or more additional touch inputs are detected. For example, an object that contacted display screen 312 at a first location may be determined, at a later point in time, to contact the display screen 312 at a second location. In the illustrative example, an object may have initially contacted display screen 312 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 312 having 100 driving lines and 100 sensing lines may have 100 intersection points, and therefore 100 individual capacitors, while a touch screen display screen 312 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by the user device 390, and therefore the fewer driving lines and/or sensing lines used, the smaller the amount of power that is needed to operate the touch screen display.

In some embodiments, the display screen 312 may correspond to a high-definition ("HD") display. For example, the display screen 312 may display images and/or videos of 720p, 1080p, 1080i, or any other image resolution. In these particular scenarios, the display screen 312 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 3,073,600 pixels. However, persons of ordinary skill in the art will recognize that the aforementioned display ratios and pixel numbers are merely exemplary, and any suitable display resolution or pixel number may be employed for the display screen 312, such as non-HD displays, 4K displays, and/or ultra-displays.

In some embodiments, the user device 390 may include one or more cameras 314, corresponding to any suitable image capturing component or components capable of capturing one or more images and/or videos. The camera(s) 314 may, in some embodiments, be configured to capture photographs, sequences of photographs, rapid shots (e.g., multiple photographs captured sequentially during a relatively small temporal duration), videos, or any other type of image, or any combination thereof. In some embodiments, the user device 390 may include multiple the cameras 314, such as one or more front-facing cameras and/or one or more rear facing cameras. Furthermore, the camera(s) 314 may be configured to recognize far-field imagery (e.g., objects located at a large distance away from the user device 390) or near-filed imagery (e.g., objected located at a relatively small distance from the user device 390). In some embodiments, the camera(s) may be high-definition ("HD") cameras, capable of obtaining images and/or videos at a substantially large resolution (e.g., 726p, 1080p, 1080i, etc.). In some embodiments, the camera(s) 314 may be optional for the user device 390. For instance, the camera(s) 314 may be external to, and in communication with, the user device 390. For example, an external camera may be capable of capturing images and/or video, which may then be provided to the user device 390 for viewing and/or processing.

Persons of ordinary skill in the art will recognize that, in some embodiments, the display screen 312 and/or camera(s) 314 may be optional for the user device 390. For instance, the user device 390 may function using audio inputs and outputting audio, and therefore the display screen 312 and/or camera(s) 314 may not be included. Furthermore, in some embodiments, the user device 390 may not include the display screen 312 and/or camera(s) 314, but instead may be in communication with the display screen 312 and/or camera(s) 314. For example, the user device 390 may be connected to a display screen via a Wi-Fi (e.g., 802.11 protocol) connection such that visual content sent to the user device 390 may be sent to the display screen, and output thereby.

In some exemplary embodiments, the user device 390 may include an additional input/output ("I/O") interface. For example, the user device 390 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of the user device 390 may include one or more lights, light emitting diodes ("LEDs"), or other visual indicator(s). Persons of ordinary skill in the art will recognize that, in some embodiments, one or more features of the output portion of the I/O interface may be included in a purely voice activated version of the user device 390. For example, one or more LED lights may be included on the user device 390 such that, when the microphone(s) 308 receive audio, the one or more LED lights become illuminated signifying that audio has been received by the user device 390. In some embodiments, one or more vibrating mechanisms or other haptic features may be included with the user device 390 to provide a haptic response to an individual.

In some embodiments, the user device 390 may include radio-frequency identification ("RFID") functionality and/or near field communication ("NFC") functionality. Furthermore, in some embodiments, the user device 390 may include one or more infrared ("IR") sensors and one or more IR emitters. The IR sensors/emitters may be used to determine depth information. For example, in one embodiment, a distance of an individual from the user device 390 may be determined using the one or more IR sensors/emitters. Depth determination may be performed using any depth determination technique. In some embodiments, a distance between an individual and the user device 390 may be employed as a basis for presenting content with varying density using the display screen 312. For example, when an individual is at a distance A from the user device 390, the user device 390 may display weather data for a current day. However as the user moves closer to the user device 390, such as at a distance B from the user device 390, which may be less than distance A, the user device 390 may display weather data for a current week. For instance, as the individual gets closer to the user device 390, the ability of the individual to see denser content increases, and as the individual moves father away from the user device 390, the individual's ability to see denser content decreases. This, for example, may ensure that the content displayed by the user device 390 is continually relevant and readable by the individual.

The computer system 300, in non-limiting, exemplary embodiments, may include the language processing system 350. However, in other embodiments, the language processing system 350 may be separate from, or in communication with, the computer system 300. The language processing system 350 is an example of the natural language processing system 142 of FIG. 1. Generally, the language processing system 350 may, in some embodiments, include one or more remote devices capable of receiving and sending content from/to one or more electronic device, such as the user device 390. The language processing system 350 may include various components and systems including, but not limited to, automatic speech recognition ("ASR") system 358, natural language understanding ("NLU") system 360, functionalities system 362, text-to-speech ("TTS") system 364, and accounts system 368. In some embodiments, language processing system 350 may also include computer readable media, including, but not limited to, flash memory, random access memory ("RAM"), and/or read-only memory ("ROM"). The language processing system 350 may also include various systems that store software, hardware, logic, instructions, and/or commands for the language processing system 350, such as a speaker identification ("ID") system 370, or any other system, or any combination thereof.

The ASR system 358 may be configured to recognize human speech in audio signals received from the user device 390, such as audio captured by the microphone(s) 308, which may then be transmitted to the language processing system 350. The ASR system 358 may include, in some embodiments, one or more processor(s) 352, storage/memory 354, and communications circuitry 356. The processor(s) 352, storage/memory 354, and communications circuitry 356 may, in some embodiments, be substantially similar to the processor(s) 302, storage/memory 304, and communications circuitry 306, which are described in greater detail above, and the aforementioned descriptions may apply. In some embodiments, the ASR system 358 may include speech-to-text ("STT") system 364. The STT system 364 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

The ASR system 358 may include an expression detector that analyzes audio signals received by the language processing system 350, such as the expression detector mentioned above with regards to the user device 390. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

The NLU system 360 may be configured such that it determines user intent based on the text data is receives from the ASR system 358. For example, the NLU system 360 may determine that the intent of utterance is for initiating a communications session with a device, associated with a particular name (e.g., initiate a communications session with "Alice"). In response to determining the intent of the utterance, the NLU system 360 may communicate the received command to an appropriate subject matter server or skill on the functionalities system 362 to perform one or more tasks, and/or retrieve an appropriate response or response information. The NLU system 360 may include processor(s) 352, storage/memory 354, and communications circuitry 356 which, in one embodiment, may be substantially similar to the processor(s) 302, storage/memory 304, and communications circuitry 306 of the user device 390, and the previous description may apply.

The functionalities system 362 (also referred to as speech-lets module 362) may, for example, correspond to various action specific systems or servers, sometimes referred to as "skills," capable of processing various task specific actions. The functionalities system 362 may further correspond to first party applications and/or third party applications capable of performing various tasks or actions. For example, based on the context of the audio data received from the user device 390, the language processing system 350 may use a certain functionality to generate a response, or to obtain response information, which in turn may be communicated back to the user device 390. For instance, an utterance may ask for weather information, and therefore the functionalities system 362 may access a weather application to obtain current weather information for a location associated with the user device 390. The functionalities system 362 may also include processor(s) 352, storage/memory 354, and communications circuitry 356. Examples of the task specific actions supported by the functionalities system 362 are further illustrated in connection with FIG. 8.

The TTS system 364 may employ various text-to-speech techniques. However, techniques for transcribing text into speech are well known in the art and need not be described in further detail herein, any suitable computer implemented text to speech technique may be used to convert the output text into audio signal(s) into text, such as SOFTSOUND speech processing technologies available from the Autonomy Corporation, which is headquartered in Cambridge, England, United Kingdom. The TTS system 364 may also include processor(s) 352, storage/memory 354, and communications circuitry 356.

The accounts system 368 may store one or more user accounts corresponding to users having a registered account on the computer system 300. For example, a parent may have a registered account on the computer system 300, and each of the parent's children may have their own user account registered under the parent's registered account. The accounts system 368 may also store one or more group accounts corresponding to one or more shared devices. For example, a shared device, such as shared the user device 390, may have its own group account stored on the accounts system 368. The group account may be associated with the shared device, and may also be linked to one or more individual's user accounts. For example, the shared user device 390 may be associated with a first group account corresponding to a first grouping of individual (e.g., a family). One or more user accounts may also be associated with the first group account (e.g., individual members of the family), corresponding to individuals that may be capable of interacting with the shared user device 390. Information, permissions (e.g., for Drop Ins), settings, and/or preferences, for example, for each user account may be stored within a user account database. In some embodiments, the accounts system 368 may store a voice signal, such as voice biometric information, for a specific user account. This may allow speaker identification techniques to be used to match a voice-to-voice biometric data associated with a specific user account. In some embodiments, the accounts system 368 may store a telephone number assigned to a particular user account, a device identifier associated with a particular device, a communications identifier associated with a particular user account and/or group account, or any other suitable information, or any combination thereof.

It should also be recognized that although each of the ASR system 358, NLU system 360, subject matter/skills system 362, TTS system 364, and accounts system 368 may each include instances of the processor(s) 352, storage/memory 354, and communications circuitry 356, and those instances of processor(s) 352, storage/memory 354, and communications circuitry 356 within each of the ASR system 358, NLU system 360, functionalities system 362, TTS system 364, and accounts system 368 may differ. For example, the structure, functionality, and style of the processor(s) 352 within ASR system 358 may be substantially similar to the structure, functionality, and style of the processor(s) 352 within NLU system 360, however the actual processor(s) 352 need not be the same entity.

The computer system 300 may also include, in a non-limiting embodiment, a communications system 340, which may be configured to facilitate communications between two or more user devices 390. The communications system 340 is an example of the communications system 144 of FIG. 1. Generally, the communications system 340 may be capable of facilitating a communications session between an initiating user device 390 (e.g., the initiating device 210) and a recipient user device 390 (e.g., the recipient device 220). Upon the language processing system 350 determining that an intent of an utterance is for a communications session to be established with another device, the user device 390 may access the communications system 340 to facilitate the communications session between the initiating user device and the recipient user device. For example, the communications system 340 may employ VoIP functionality to facilitate audio, video, and/or text data communications between the initiating user device and the recipient user device.

As an illustrative example, a communications session between two devices is described below to illustrate how the communications session may be established. In one example embodiment, an individual (e.g., a caller) may speak an utterance (e.g., "Alexa, send a message to Alice: 'Want to have dinner at my place?'") to their user device 390 (e.g., the initiating user device 210). In response to detecting the device's wakeword (e.g., "Alexa"), the user device 390 may begin sending audio data representing the utterance to the computer system 300, and in particular to the language processing system 350. Upon receipt, the ASR system 358 may perform speech recognition processing, such as speech-to-text processing, to the audio data to generate text data representing the audio data. The text data may then be passed to the NLU system 360 to determine the intent of the utterance. For example, the NLU system 360 may include a listing of sample utterances to be used to disambiguate the spoken words and determine an action intended to occur for the utterance. In some embodiments, a messaging speechlet system may be included within the NLU system 360 that includes one or more sample utterance frameworks. If the format of the spoken utterance substantially matches one of these sample utterances, then that may indicate that the intent of the utterance was for a communications session to be initiated. For instance, one sample utterance may be "{Wakeword}, send a message to {Contact Name}: {Message}." If the framework of the spoken utterance's text data substantially matches this sample utterance framework, the NLU system 360 may determine that the intent of the utterance was to start a communications session with a contact of the user, and NLU may also determine that the intended target of the communications session is "Alice" (e.g., {Contact Name}: Alice). After determining that a message is to be sent to a contact named "Alice," the communications system 340 may rely on a contact services system 328 that accesses the accounts system 368 determines whether any device identifiers (e.g., a device address) are associated with the contact, "Alice." If multiple devices are determined, the communications system 340 may access a preferences system 324 that stores preferences of the contact for using the different devices and a contact presence monitoring system 344 that detects the presence of the contact relative to these devices and provides proximity information. The communications system 340 identifies a particular device or a particular subset of the devices that communications with which the communications can be initiated.

In some embodiments, the communications system 340 may establish a communications session between an initiating device 390 and a recipient device 390 using one or more VoIP protocols including, but not limited to SIP, RTP, RTCP, SRTP, and SDP or other communication protocols implemented by a communications routing service 326. In one illustrative embodiment, a SIP signaling command may be provided to the communications system 340 for communicating with the recipient device. In particular, PJSIP functionality adds a new "user-to-user" header that indicates the device pair for the communications session.

In some embodiments, the communications system 340 may include a communication rules engine 342 that may store various rules for how certain communications between group accounts and user accounts are to behave and that may store device information for different user devices. For example, the communications rules engine 342 may store communications routing information and instructions for how different messages may be sent from one device to another device depending on a variety of parameters including, but not limited to, if the sender device is a shared device, if the recipient device is a shared device, if the sender device is a personal device, if the recipient device is a personal device, if there are any personal and/or shared devices associated with the sender device and/or recipient device, and/or whether or not speaker identification was able to positively identify a speaker. Other parameters relate to the device information, such as device type identifier, software version, and status. In some illustrative embodiments, the communication rules engine 342 may store a communications table indicating various device identifiers, group account identifiers, communication identifiers, and device types for various devices interacting with the communications system. In addition, the communication rules engine 342 may generate content, such as TTS audio, based on an identifier of the user device 390, where this content can identify a party initiating a communications session (e.g., the caller and/or the user device 390).

In some embodiments, the communications system 340 may also include a message data store that may correspond to any suitable type of storage/memory, such as that of the storage/memory 304, 354, that is capable of storing one or more messages sent/received, including the content about the initiating party. For example, when an individual sends a message (e.g., "Want to have dinner at my place?") from their shared electronic device to another shared electronic device, that message may be stored by the communications system using the message data store. In some embodiments, the message data store may be structured to store audio data representing audio message, video data representing video messages, image data representing image messages, text data representing text messages, and/or message notification metadata. When an individual utters a request to receive messages received for their user account and/or group account, the communications system 340 may access the message data store to obtain those messages, and may send the appropriate message data (e.g., audio, video, image, text, etc.) to the corresponding requesting device (e.g., personal device, shared device).

In some embodiments, the message data store may store each message with a corresponding communications identifier, group account identifier, user account identifier, and/or device identifier with which that message is directed to. For example, if a first individual sends an audio message to a second individual, audio data representing that audio message may be stored by the message data store with a group account identifier associated with the second individual's corresponding group account, as stored by accounts system 368. This way, when an individual requests to receive messages associated with their group account, the message data store may be accessed to obtain any messages currently stored thereby that are associated with that group account's group account identifier.

The computer system 300 may also include, in some embodiments, a speaker identification system 370 that may correspond to any suitable device/system capable of identifying a particular person's voice from an audio signal. The speaker identification system 370 may determine whether a current voice being used to speak matches known voice biometric data associated with a particular individual's voice. In some embodiments, voice biometric data may be stored within the accounts system 368 for various individuals having a user account stored thereby. For example, the caller may have a user account on the computer system 300 (e.g., stored within the accounts system 368), which may be associated with the initiating device 210. Stored within that user account may be voice biometric data associated with a voice profile for the caller. Therefore, when an utterance is detected, and subsequently when audio data representing that utterance is received by the computer system 300, the speaker identification system 370 may determine whether the voice that spoke utterance matches, to at least a predefined confidence level, the stored voice biometric information associated with the caller stored by their user account. If so, then this may indicate that the caller is the likely speaker of the utterance.

The communications rules engine 342 may employ several communications rules for messages sent/received to/from one or more participants. First, a device type of the sending device may be determined. For example, a determination may be made as to whether or not a device identifier associated with the device that the audio data representing the utterance, which include a message to be sent to another individual's device, is associated with a shared device. Next, a determination may be made by the speaker identification system 370 as to whether or not a speaker that spoke the utterance was identified. Using these two parameters, for instance, the communications rules engine 342 may be configured to cause the communications system 340 to facilitate communications between two or more devices.

Figure 4:
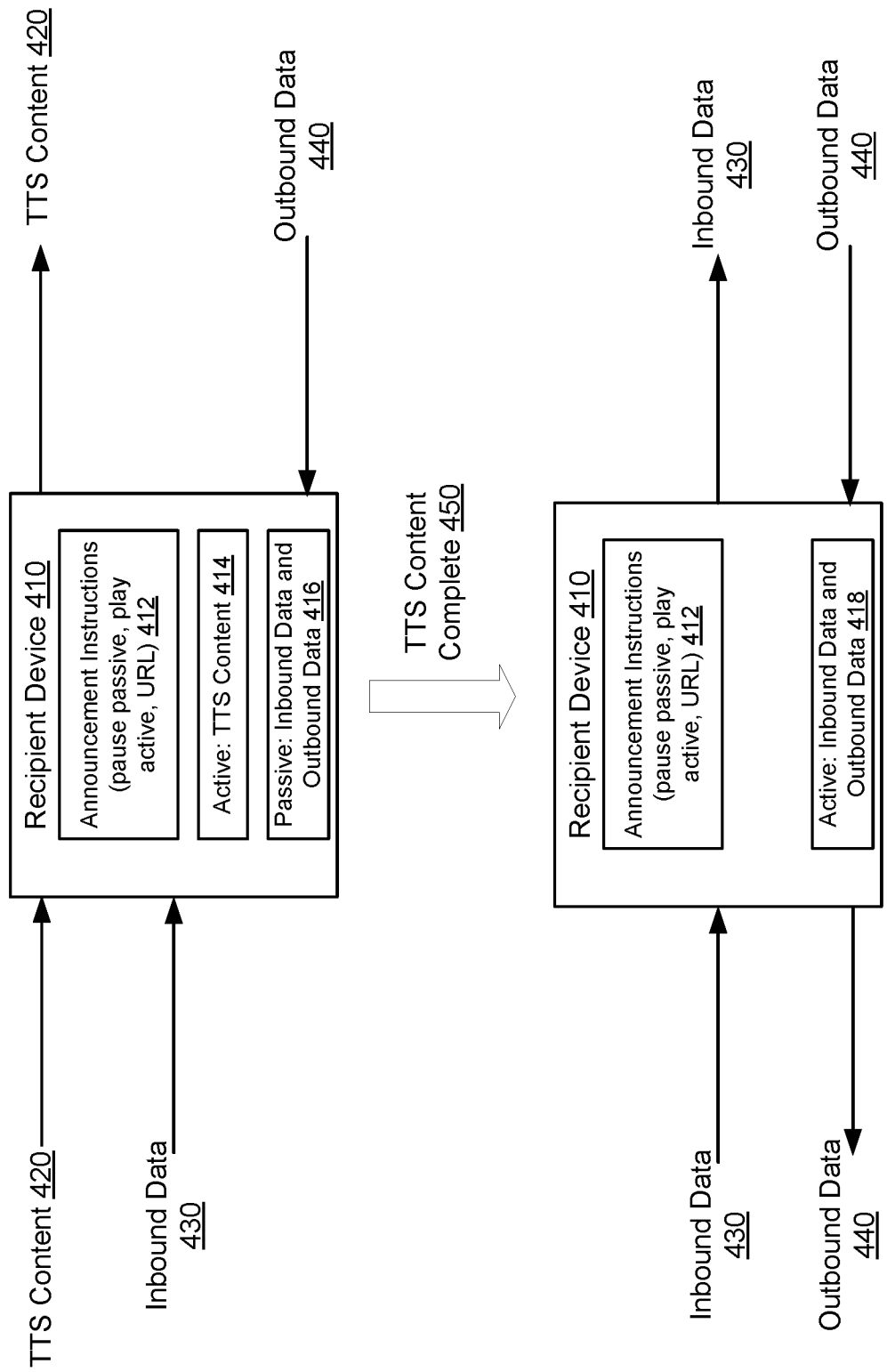
FIG. 4 illustrates an example recipient device in communications with an initiating device, in accordance with various embodiments.

FIG. 4 illustrates an example recipient device 410 in communications with an initiating device, in accordance with various embodiments. In this illustration, the recipient device 410 already established a communications session with the initiating device (e.g., a synchronous audio communications session that should be automatically accepted) per instructions of a computer system. The instructions also direct the recipient device 410 to announce information about the initiating party (e.g., the initiating device and/or the user of the initiating device) once the communications was established. The instructions include multiple parameters that control the presentation of the announcement's content and other data at the recipient device 410. The recipient device 410 is an example of the recipient device 220 of FIG. 2.

In an example, one parameter of the instructions identifies a network address (e.g., a URL) of TTS content 420 for the announcement that was generated by the computer system and that was stored as an audio file in a data store. Another parameter of the instructions specifies that the TTS content 420 should be streamed from the network address. Yet another parameter of the instructions specifies that, while the TTS content 420 is being streamed, the presentation of inbound data 430 (e.g., the caller's audio data) from the initiating device in the communications session and the transmission of outbound data 440 (e.g., the contact's audio data) from the recipient device 410 in the communications session should be paused.

As illustrated, the recipient device 410 stores the parameters as announcement instructions 412 (where "pause passive" corresponds to pausing the presentation of the inbound data 430 and the transmission of the outbound data 440, "play active" corresponds to streaming the TTS content 420, and "URL" corresponds to the network address of the TTS content 420). A communications application is executed on the recipient device 410 and is used to exchange audio data (e.g., the inbound data 430 and outbound data 440) in the communications session. The communications application accesses the announcement instructions 412 and presents the TTS content 420 accordingly.

For instance, the inbound data 430 and outbound data 440 are on a dialog channel of the recipient device 410. In comparison, the TTS content 420 is on a content channel of the recipient device 410. Based on the announcement instructions 412, the communications application sets the audio focus or the audio session to the content channel (e.g., the content channel is active 414), thereby presenting the TTS content 420 on a speaker of the recipient device 410, while the presentation of the inbound data 430 and the transmission of the outbound data 440 on the dialog channel are paused (e.g., the dialog channel is passive 416).

As further illustrated, once the presentation of the TTS content 420 is complete 450 (e.g., the streaming of the corresponding audio file is complete), the presentation of the inbound data 430 on the speaker of the recipient device 410 resumes. In addition, the transmission of the outbound data 440 received from a microphone of the recipient device 410 resumes. For instance, the communications application sets the audio focus or the audio session to the dialog channel, thereby presenting the inbound data 430 on the speaker and transmitting the outbound data 440 to the initiating device (e.g., the dialog channel is now active 418).

Figure 5:
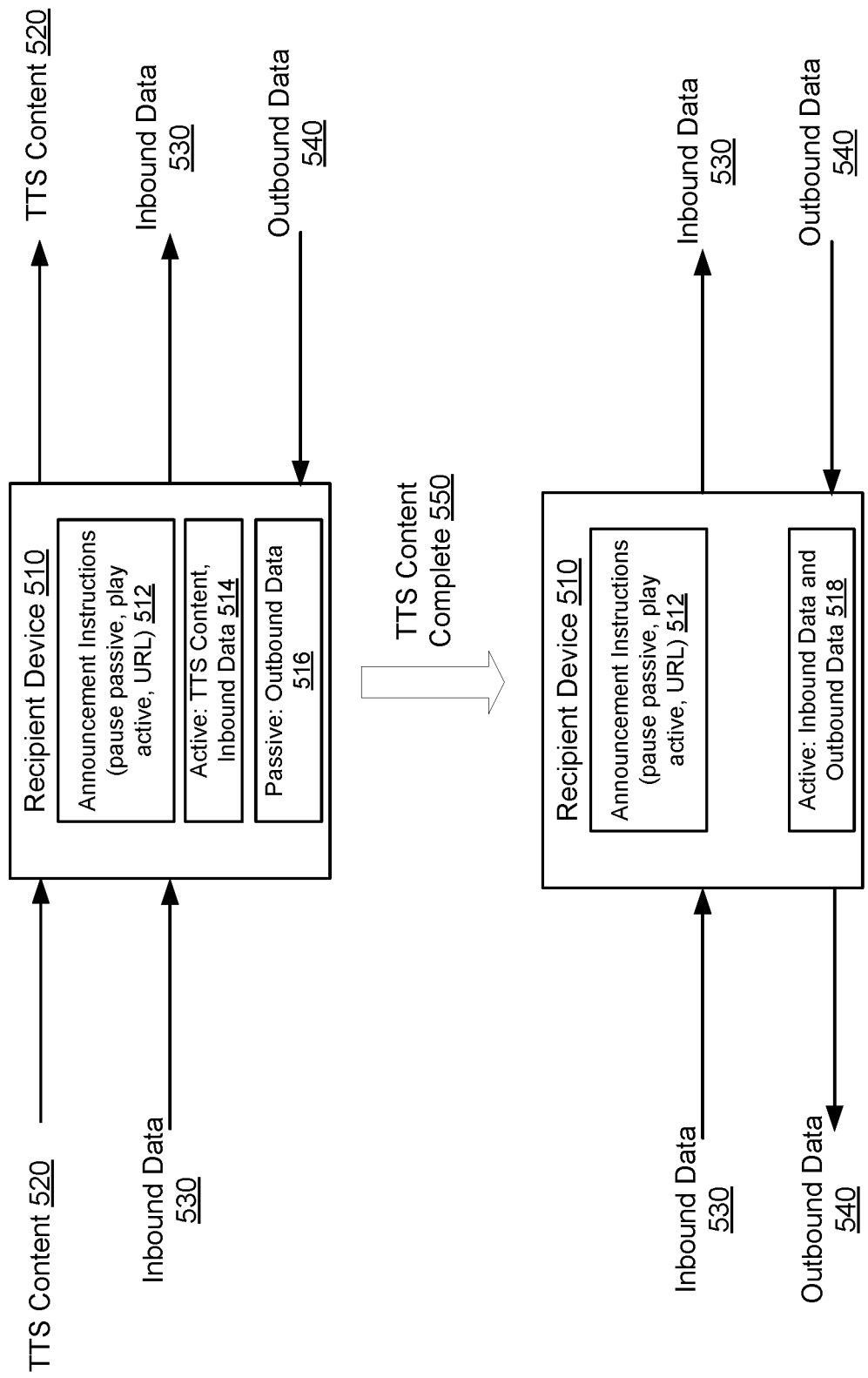
FIG. 5 illustrates another example recipient device in communications with an initiating device, in accordance with various embodiments.

FIG. 5 illustrates another example recipient device 510 in communications with an initiating device, in accordance with various embodiments. In this illustration, the recipient device 510 already established a communications session with the initiating device (e.g., a synchronous audio communications session that was automatically accepted) per instructions of a computer system. The instructions also direct the recipient device 510 to announce information about the initiating party (e.g., the initiating device and/or the user of the initiating device) while also presenting inbound data from the initiating device. The recipient device 510 is an example of the recipient device 220 of FIG. 2.

In an example, one parameter of the instructions identifies a network address (e.g., a URL) of TTS content 520 for the announcement that was generated by the computer system and that was stored as an audio file in a data store. Another parameter of the instructions specifies that the TTS content 520 should be streamed from the network address. Yet another parameter of the instructions specifies that, while the TTS content 520 is being streamed, inbound data 530 (e.g., the caller's audio data) from the initiating device in the communications session should be also presented. A further parameter specifies that the transmission of outbound data 540 (e.g., the contact's audio data) from the recipient device 510 in the communications session should be paused.

As illustrated, the recipient device 510 stores the parameters as announcement instructions 512 (where "pause passive" corresponds to pausing the transmission of the inbound data 530 and the transmission of the outbound data 540, "play active" corresponds to streaming the TTS content 520 and presenting the inbound audio data 530, and "URL" corresponds to the network address of the TTS content 520). A communications application is executed on the recipient device 510 and is used to exchange audio data (e.g., the inbound data 530 and outbound data 540) in the communications session. The communications application accesses the announcement instructions 512 and presents the TTS content 520 and the inbound data 530 accordingly.

For instance, the inbound data 530 and outbound data 540 are on an inbound dialog channel and outbound dialog channel, respectively, of the recipient device 510. In comparison, the TTS content 520 is on a content channel of the recipient device 510. Based on the announcement instructions 512, the communications application sets the audio focus or the audio session to the content channel and the inbound dialog channel (e.g., the content channel and the inbound dialog channel are active 514), thereby simultaneously presenting the TTS content 520 and the inbound data 530 on a speaker of the recipient device 510, while the transmission of the outbound data 540 on the outbound dialog channel is paused (e.g., the outbound dialog channel is passive 516).

As further illustrated, once the presentation of the TTS content 520 is complete 550 (e.g., the streaming of the corresponding audio file is complete), the transmission of the outbound data 540 received from a microphone of the recipient device 510 resumes. For instance, the communications application sets the audio focus or the audio session to the inbound and outbound dialog channels, thereby presenting the inbound data 530 on the speaker and transmitting the outbound data 540 to the initiating device (e.g., the inbound and outbound dialog channels are now active 518).

Figure 6:
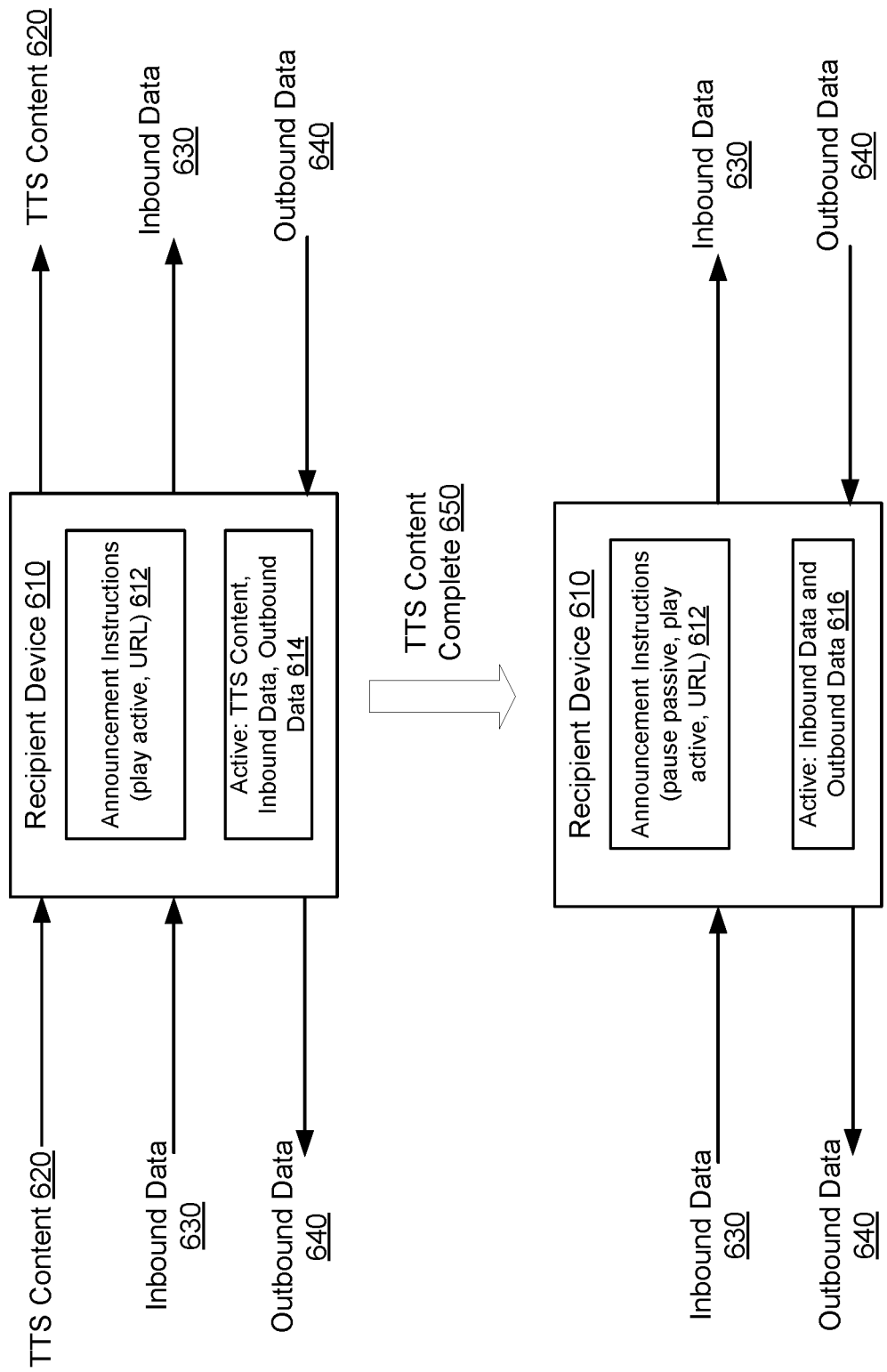
FIG. 6 illustrates yet another example recipient device in communications with an initiating device, in accordance with various embodiments.

FIG. 6 illustrates yet another example recipient device in communications with an initiating device, in accordance with various embodiments. In this illustration, the recipient device 610 already established a communications session with the initiating device (e.g., a synchronous audio communications session that was automatically accepted) per instructions of a computer system. The instructions also direct the recipient device 610 to announce information about the initiating party (e.g., the initiating device and/or the user of the initiating device) while also presenting inbound data from the initiating device and transmitting outbound audio data from the recipient device 610. The recipient device 610 is an example of the recipient device 220 of FIG. 2.

In an example, one parameter of the instructions identifies a network address (e.g., a URL) of TTS content 620 for the announcement that was generated by the computer system and that was stored as an audio file in a data store. Another parameter of the instructions specifies that the TTS content 620 should be streamed from the network address. Yet another parameter of the instructions specifies that, while the TTS content 620 is being streamed, inbound data 630 (e.g., the caller's audio data) from the initiating device in the communications session should be also presented and outbound data 640 (e.g., the contact's audio data) from the recipient device 610 in the communications session should be transmitted.

As illustrated, the recipient device 610 stores the parameters as announcement instructions 612 (where "play active" corresponds to streaming the TTS content 620, presenting the inbound audio data 630, and transmitting the outbound data 640, and "URL" corresponds to the network address of the TTS content 620). A communications application is executed on the recipient device 610 and is used to exchange audio data (e.g., the inbound data 630 and outbound data 640) in the communications session. The communications application accesses the announcement instructions 612, and presents the TTS content 620 and the inbound data 630 and transmits the outbound data 640 accordingly.

For instance, the inbound data 630 and outbound data 640 are on a dialog channel of the recipient device 610. In comparison, the TTS content 620 is on a content channel of the recipient device 610. Based on the announcement instructions 612, the communications application sets the audio focus or the audio session to the content channel and dialog channel (e.g., the content channel and the dialog channel are active 614), thereby simultaneously presenting the TTS content 620 and the inbound data 630 on a speaker of the recipient device 610 and transmitting the outbound data 640 on the outbound dialog channel.

In this example, because the outbound data 640 is transmitted while TTS content 620 is presented, the outbound data 640 would include audio data from the presentation of the TTS content 620 in addition to the contact's audio data. Similarly, because the outbound data 640 is transmitted while the inbound data 630 is presented, the outbound data 640 would also include audio data from the presentation of the inbound data 630. To exclude unwanted audio data (e.g., audio data from the presentations of the TTS content 620 and the inbound data 630), the recipient device 610 can use noise canceling to filter out the unwanted audio data while passing the contact's audio data. In particular, the inbound audio 630 and the TTS content 620 are added to a noise canceling reference signal. The noise canceling reference signal and the audio data detected by the microphone of the recipient device (e.g., this audio data includes the unwanted audio data and the contact's audio data) are input to a noise canceling process implemented by the communications application. The noise canceling process filters the unwanted audio data by subtracting the noise canceling reference signal from the audio data detected by the microphone. An output of the noise canceling process is the outbound data 640 that includes the contact's audio data and excludes the unwanted audio data.

As further illustrated, once the presentation of the TTS content 620 is complete 650 (e.g., the streaming of the corresponding audio file is complete), the communications application continues to present the inbound audio data 630 and the transmission of the outbound audio data 640. For instance, the communications application sets the audio focus or the audio session to the dialog channel, thereby presenting the inbound data 630 on the speaker and transmitting the outbound data 640 to the initiating device (e.g., the dialog channel remains active 616).

As described herein above in connection with FIGS. 4-6, a recipient device announces information about a party that has initiated a communications session therewith based on instructions from a computer system that facilitates the establishing of the communications session between the recipient device and the initiating device. In an example, the instructions are provided from a communications system of the computer system, such as from the communications system 340 of the computer system 300 of FIG. 3. However, the embodiments of the present disclosure are not limited as such. For example, the communications system can set-up a multi-party communication (e.g., a conference call that is automatically answered by the recipient device) between the initiating device, the recipient device, and the communication system. In this example, the communication system can present the announcement content (e.g., any of the TTS content 420, 520, or 620 of FIGS. 4-6) by sending this announcement content as inbound data to the recipient device. Because the announcement content is received as inbound data, the recipient device can present it in a similar manner as it is presenting the caller's inbound data. In other words, the instructions of the computer system need not include the URL of the announcement content. Instead, the instructions can specify that the communications session should be established, that the inbound data from the communications system should be presented (as in FIGS. 4-6), that the presentation of the inbound data from the initiating device is paused (as in FIG. 4) or presented (as in FIGS. 5 and 6) while the announcement content is presented, and that the transmission of the outbound data from the recipient device to the initiating device is paused (as in FIGS. 4 and 5) or resumed (as in FIG. 6) while the announcement content is presented.

Figure 7:
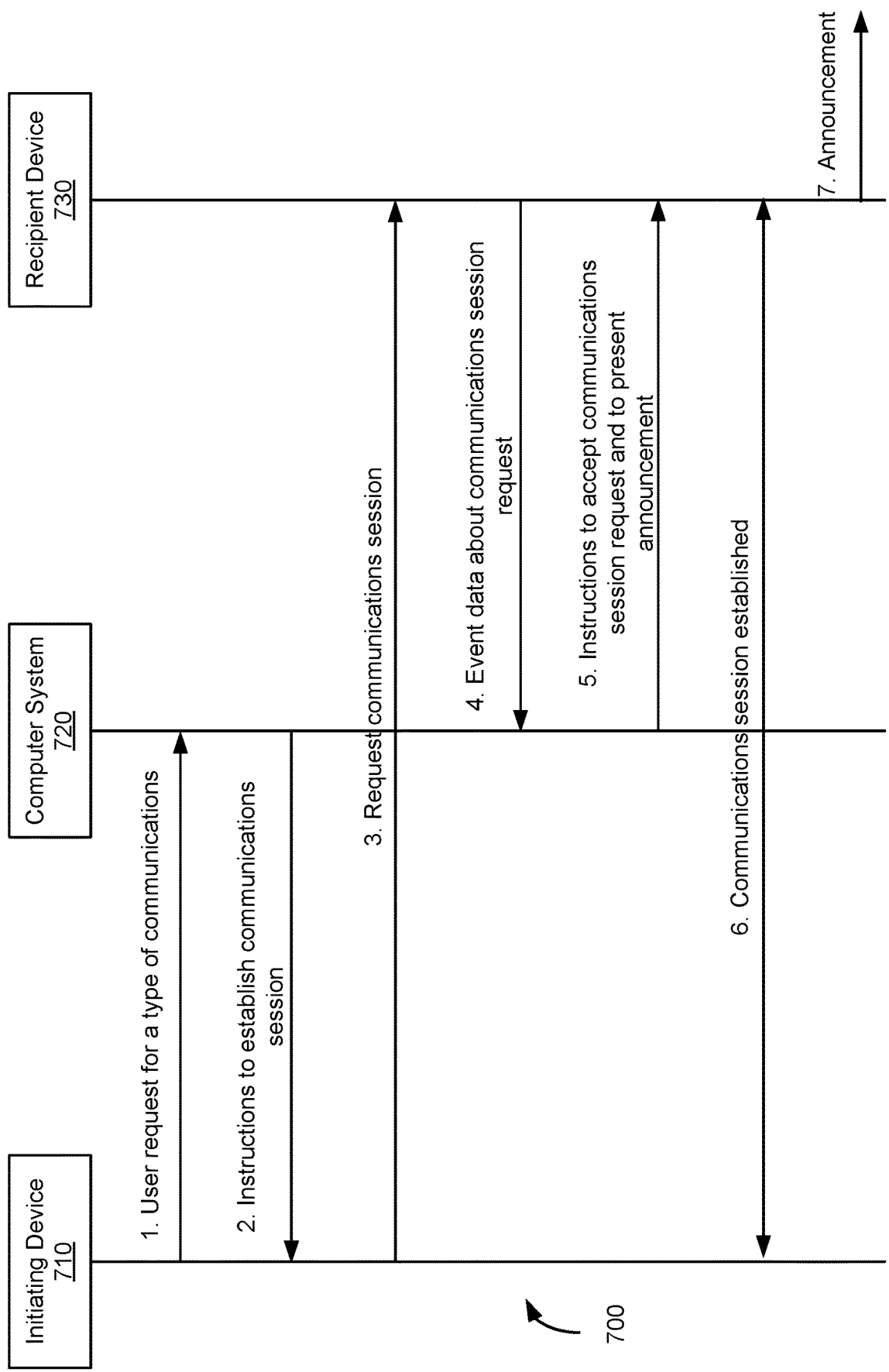
FIG. 7 illustrates an example sequence diagram between an initiating device, a computer system, and a recipient device, in accordance with various embodiments.

FIG. 7 illustrates an example sequence diagram 700 between an initiating device 710, a computer system 720, and a recipient device 730, in accordance with various embodiments. The computer system 720 facilitates a communications session between the initiating device 710 and the recipient device 730, where the instructions direct the recipient device 730 to announce information about an initiating party once the communications session is established. In an example, the communications session is a synchronous audio communications session that is initiated by the initiating device 710 in response to user input at the initiating device 710 and that is automatically accepted at the recipient device 730 without user input at the recipient device 730 for the acceptance. The initiating device 710, the computer system 720, and the recipient device 730 are examples of the initiating device 210, the computer system 230, and the recipient device 220 of FIG. 2, respectively.

The initiating device 710 sends a user request for a type of communications (e.g., a Drop In on a contact) in response to the user input at the initiating device 710. The user input can include a user utterance or an explicit manual input of a caller operating the initiating device 710 and requesting the type of communications based on contact data of the contact. The computer system 720 receives the user request and applies ASR and NLU processing thereto if the user request was based on a user utterance. The type of communications (e.g., Drop In) and the contact are identified from the user request. The computer system matches the contact with a name (or other contact's identifier) in the contacts list of a user account of the caller and determines the identifier of the recipient device 730 (e.g., its MAC address) for the match. The computer system also determines from a user account of the contact whether a preset permission for the type of communications exist. If so, the computer system generates instructions about establishing the communications session of the requested type with the recipient device 730. The instructions can include relevant data for the initiating device 710 to communicate with the recipient device 730, such as the identifier of the recipient device 730 (e.g., its MAC address), the network address of the recipient device 730 (e.g., its IP address), and network routing data. In an example, the computer system acts as a soft switch for the communications session. The computer system sends the instructions to the initiating device 710 and, in response, the initiating device 710 sends a request for the communications session to the recipient device 730. The computer system 730 can route the request to the recipient device 730.

Upon receiving the request of the initiating device 710, the recipient device 730 sends event data to the computer system about this request. The event data identifies the initiating device 710 (e.g., by including a MAC address or some other identifier of the initiating device 710). The computer system 720 receives the event data and, given the initiating device's 710 identifier, identifies the initiating party. For instance, the computer system 720 accesses the contact's user account and determines a match between the identifier and a name of the caller and/or a profile name of the initiating device 710 from a contacts list under the user account. In another illustration, the computer system 720 determines the initiating device's 720 profile name from a user account of the caller. Once the initiating party is identified, the computer system 720 generates an announcement that the type of communications has been established with the initiating party (e.g., an announcement explaining that a Drop In from the caller's name and/or the recipient device's 730 profile name was established and is ongoing). The announcement can be stored as a content file in a data store, where the content file has a network address (e.g., a URL). The computer system 720 also sends instructions to the recipient device 730 to accept the request of the initiating device 710 for the communications session and to present the announcement once the communications session is established. These instructions can include one or more parameters that control the presentation of the announcement, such as the network address corresponding to the announcement, the streaming of the content, and the pausing or simultaneous presentation of inbound data to and the transmission of outbound data from the recipient device 730.

The recipient device 730 receives the instructions and, accordingly, accepts the request of the initiating device 710, thereby automatically establishing the communications session with the initiating device 710. The computer system 720 can act as a soft switch that routes inbound and outbound data between the initiating device 710 and the recipient device 730 while the communications session remains established. The recipient device 730 also presents the announcement by, for instance, streaming the announcement from the data store and, as applicable, pausing the presentation of inbound data from the initiating device 710 in the communications session and/or the transmission of outbound data from the recipient device 730 in the communications session. Once the presentation of the announcement is completed, the recipient device 730 presents (or continues to present as applicable) inbound data from the initiating device 710 in the communications session. In addition, the recipient device 730 transmits (or continues to transmit as applicable) outbound data to the initiating device 710 in the communications session.

Figure 8:
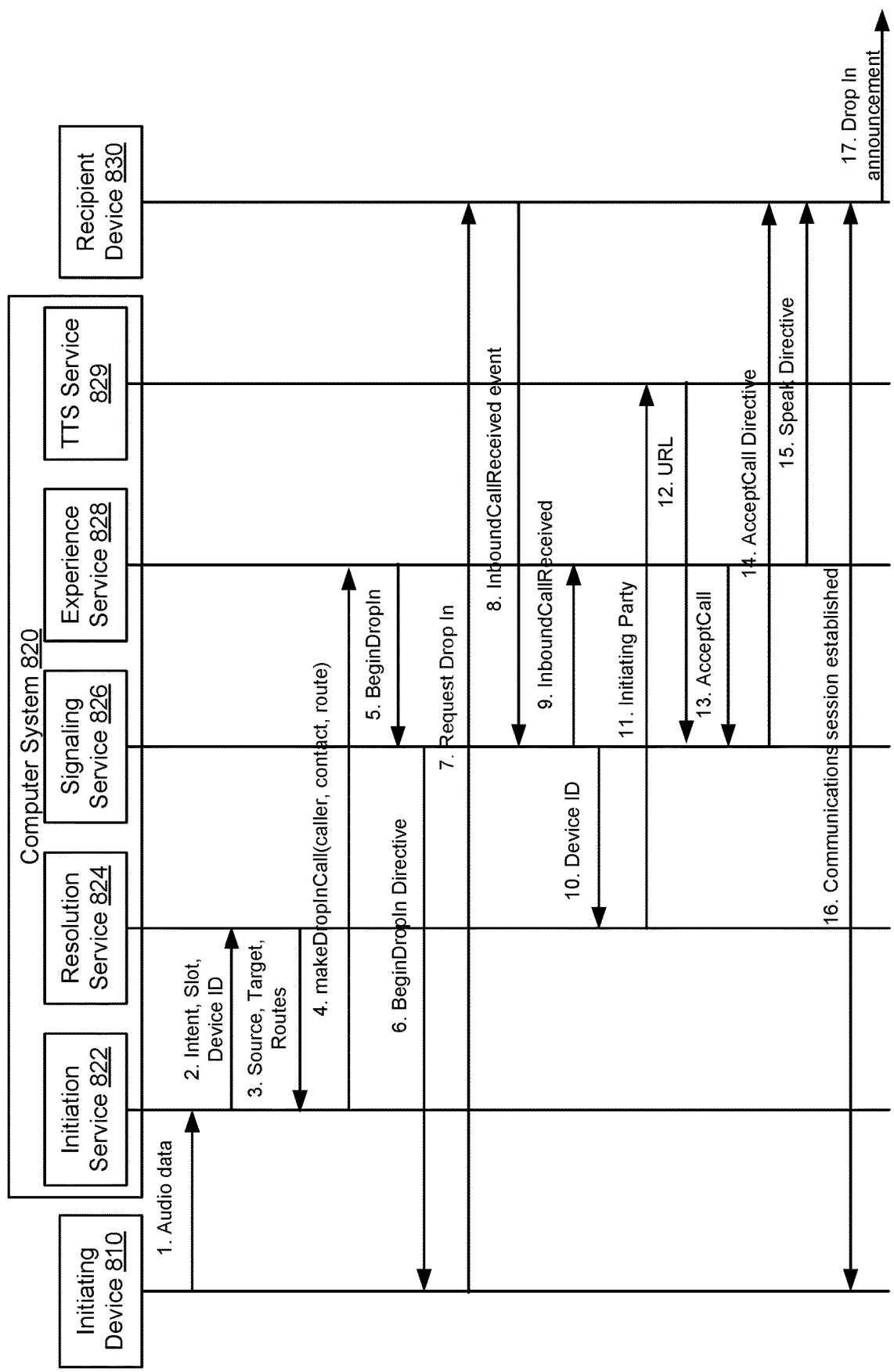
FIG. 8 illustrates another example sequence diagram between an initiating device, a computer system, and a recipient device, in accordance with various embodiments.

FIG. 8 illustrates another example sequence diagram 800 between an initiating device 810, a computer system 820, and a recipient device 830, in accordance with various embodiments. The sequence diagram 800 can be implemented as an example of the sequence diagram 700 of FIG. 7, where the computer system 820 is an example of the computer system 720. As illustrated, the computer system 820 includes multiple services, such as an initiation service 822, a resolution service 824, a signaling service 826, an experience service 829, and a TTS service 829. Some or all these computing services can be implemented as modules, including speechlets modules, within a natural language processing system, a communications system, and/or a TTS system of the computer system 820. Generally, the computing services are used to facilitate a Drop In from the initiating device 810 to the recipient device 830, where the recipient device 830 announces the Drop In and information about the initiating party once the corresponding synchronous audio communications session is automatically established between the initiating device 810 and the recipient device 830.

Upon a user utterance of a caller operating the initiating device 810 ("Alexa, drop in on Alice") and upon a detection of a wakeword in the user utterance (e.g., Alexa), the initiating device 810 sends audio data to the computer system 820, where the audio data represents the user utterance. The initiation service 822 receives the audio data, performs ASR to generate text data from the audio data, and performed NLU processing to determine an intent and a slot. The intent indicates the requested type of the communications session (e.g., a Drop In). The slot corresponds to the contact from the user utterance (e.g., Alice). The initiation service 822 also determines an identifier of the initiating device 810 (e.g., device identifier) and sends this identifier with the intent and the slot to the resolution service 824. The resolution service 824 looks up, based on the device identifier, a user account under which the initiating device 810 is registered, looks up, based on the slot, a contacts list under the user account, and determines an identifier of the recipient device 830 (e.g., from the contacts list or from another user account that is looked up based on a unique identifier of the matched contact). Given the identifiers of the initiating device 810 and the recipient device 830 and given that the intent is for a synchronous audio communications session, the resolution service 824 determines a source, a target, and one or more routes for this communications session. The source corresponds to the identifier of the initiating device 810 and can include its network address. The target corresponds to the identifier of the recipient device 830 and can include its network address. A route can include a network path between the source and the target, such as any proxy servers, gateways, and other network nodes. The resolution service 824 sends the source, target, and the route(s) to the initiation service 822.

The initiation service 822 sends a request to the experience service 828 to make a Drop In. This request identifies the caller, the contact, and a route. In response, the experience service 828 determines whether a preset permission for the Drop In exists. If so, the experience service 828 requests the signaling service 826 to begin the Drop In. This request can identify the source, target, and the route. In turn, the signaling service 826 sends a directive to the initiating device 810 to begin the Drop In (illustrated in FIG. 8 as a "BeginDropin" directive). The directive represents a set of instructions that direct the initiating device 810 to establish the synchronous audio communications session with the recipient device 830. This directive can identify the target and the route to the initiating device 810.

Next, the initiating device 810 sends a request for the Drop In to the recipient device 830 based on the directive received from the signaling service 826. In response, the recipient device 830 sends event data to the computer system 820, where the event data corresponds to event about an inbound Drop In from the initiating device 810. The event data indicates that the synchronous audio communications session was requested and identifies the initiating device 810.

The signaling service 826 receives the event data and, in responses, sends a request to the experience service 828 to confirm whether the communications session should be accepted. For instance, the request indicates that an inbound Drop In was received by the recipient device 830. Based on its previous decision to begin the Drop In for the recipient device 830, the experience service 828 sends a response to the signaling service indicating that the Drop In should be accepted. Accordingly, the signaling service 826 sends an "AcceptCall" directive to the recipient device 830 to accept the Drop In and thereby establishing the synchronous audio communications session with the initiating device 810.

In addition, to announcing the initiating party, some of the computing services are used before and/or after the event data is received from and before the "AcceptCall" directive is sent to the recipient device 830. In particular, the computing services collectively identify the initiating party and include instructions about announcing the Drop In from the initiating party in a "Speak" directive to the recipient device 830. Such functionalities can be performed at any time after the receipt of the event data or even before the receipt of the event data. Generally, the sooner the functionalities are performed, the smaller the latency is for establishing the synchronous audio communications session.

In an example, upon receiving the event data, the signaling service 826 also sends the identifier of the initiating device 810 to the resolution service 824 in parallel to, before, or after sending the request to the experience service 828 for confirming that the Drop In should be accepted. In another example, the initiating device's 810 identifier is sent after the experience services 828 responds with a confirmation about accepting the Drop In. In yet another example, upon sending the "BeginDropIn" directive, the signaling service 826 also sends the identifier of the initiating device 810 to the resolution service 824. In these examples, the resolution service 824 determines an initiating party based on the identifier of the initiating device 810, as further described in connection with FIG. 10. The resolution service 824 sends the identifier of the initiating party to the TTS service 829.

The TTS service 829 receives the identifier of the initiating party and generates TTS content that includes this identifier and that explains that a Drop In was initiated from and is ongoing with the initiating party. The TTS service 829 stores the TTS content as an audio file in a data store and returns a URL of the audio file to the signaling service 826. Upon receiving the URL from the TTS service 829 and the confirmation to accept the Drop In from the experience service 828 (or upon receiving the URL after having received the confirmation, as applicable), the signaling service 826 generates and sends the "Speak" directive to the recipient device 830. The "Speak" directive includes the URL and parameters that control the presentation of the TTS content and the presentation of inbound data and transmission of outbound data while the TTS content is being presented.

The recipient device 830 receives the "AcceptCall" and the "Speak" directives of the signaling service 826. Based on the instructions in the "AcceptCall" directive, the recipient device 830 accepts the request of the initiating device 810, thereby the synchronous audio communications session is established between the initiating device 810 an the recipient device 820. Based on the instructions in the "Speak" directive, the recipient device presents, in addition to an optional chime and other audible or visual indicators (e.g., a particular light color or pattern), a Drop In announcement identifying the initiating party and that the Drop In was established and is ongoing by, for instance, streaming the TTS content and, as applicable, pausing the presentation of the inbound data and the transmission of the outbound data in the communications session until the streaming is completed.

Figure 9:
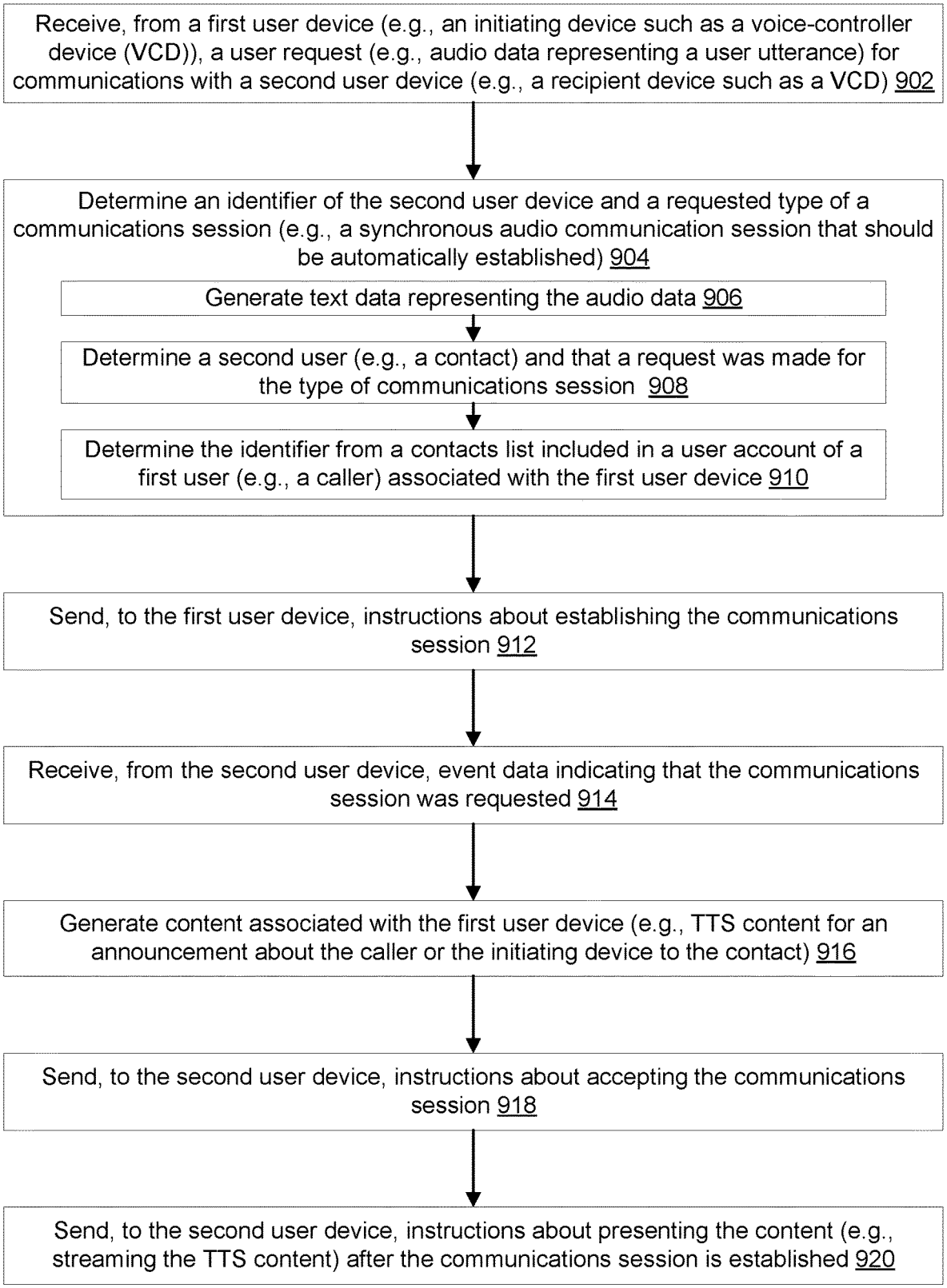
FIG. 9 illustrates an example flow for managing communications between an initiating device and a recipient device, in accordance with various embodiments.
Figure 10:
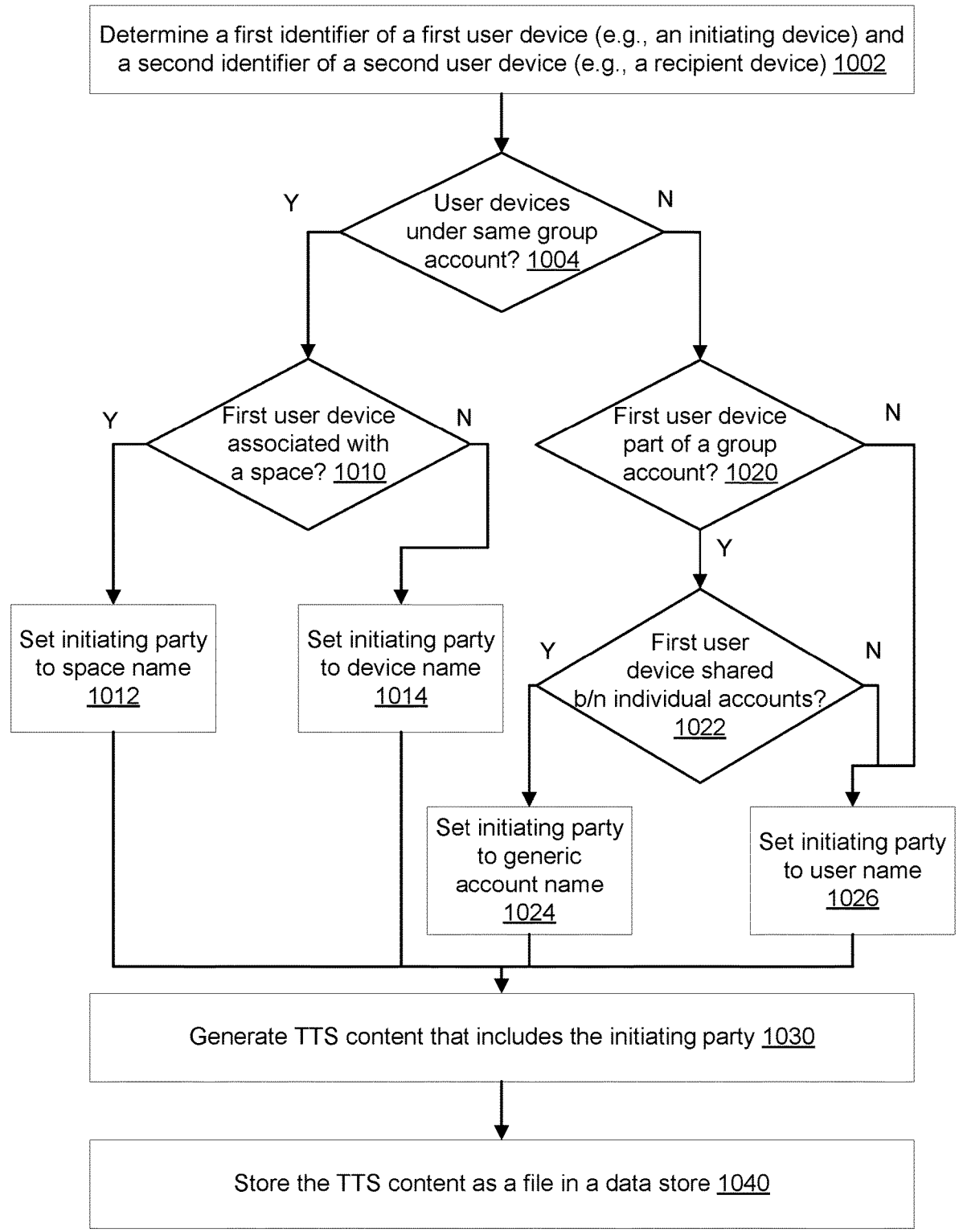
FIG. 10 illustrates an example flow for generating content associated with announcing a communications session, in accordance with various embodiments.
Figure 11:
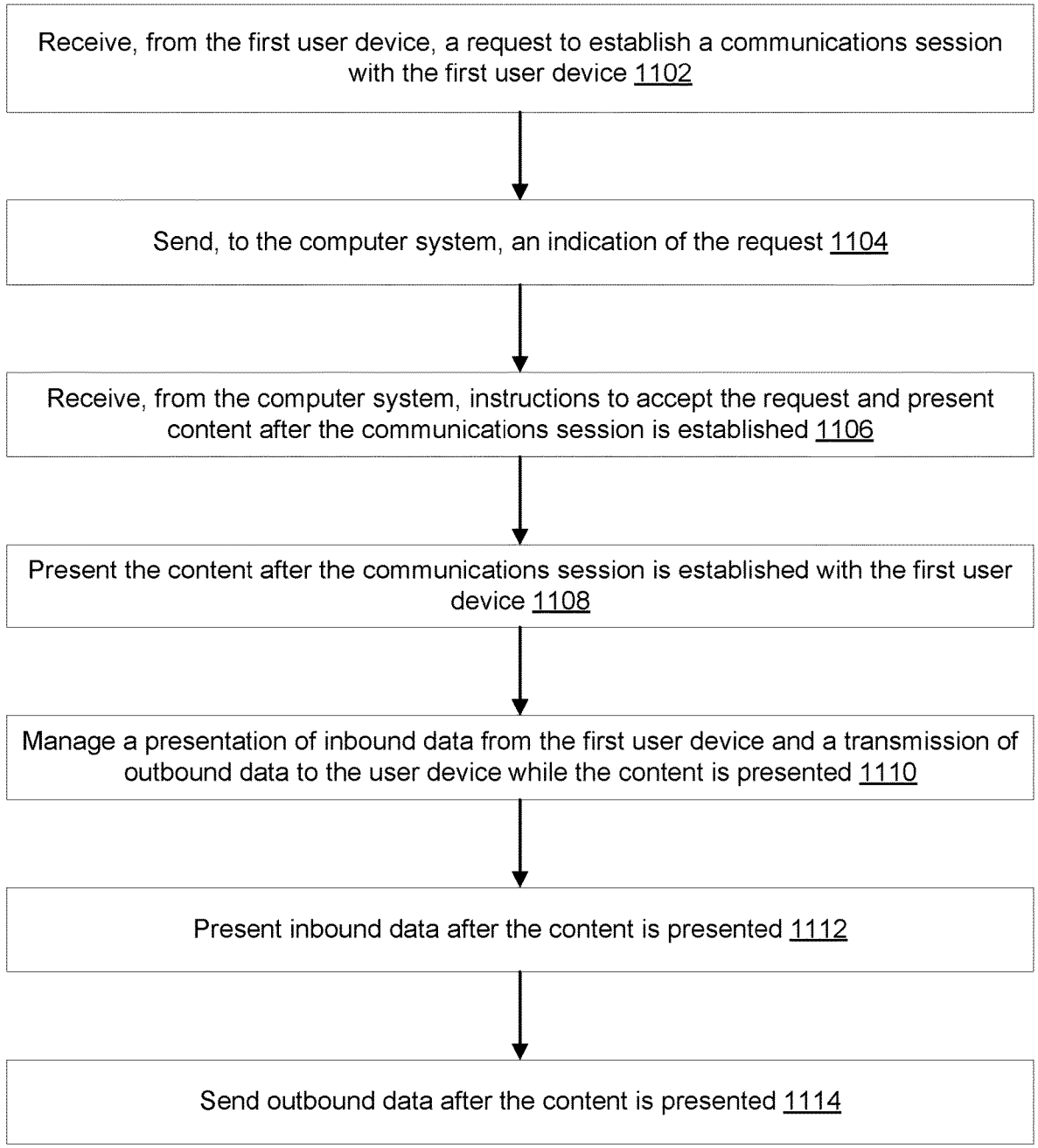
FIG. 11 illustrates an example flow for responding by a recipient device to a request of an initiating device for a communications session, in accordance with various embodiments.

FIGS. 9-11 show illustrative flows for communications between user devices, in accordance with various embodiments. Some or all of instructions for performing the operations of the illustrative flow can be implemented as hardware circuitry and/or stored as computer-readable instructions on a non-transitory computer-readable medium of a computer system and/or a user device, such as the computer system 230 and the recipient device 220 of FIG. 2. As implemented, the instructions represent modules that include circuitry or code executable by a processor(s) of the computer system and/or the user device. The use of such instructions configures the computer system and/or the user device to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In the interest of clarity of explanation, the examples flows are described in connection with an initiating device requesting a particular type of communications (e.g., a Drop In) with a recipient device. The initiating and recipient devices are examples of a first user device of a caller and a second user device of a contact exchanging communications based on a communications system of the computer system.

FIG. 9 illustrates an example flow for managing communications between the initiating device and the recipient device, in accordance with various embodiments. In an example, the flow starts at operation 902, where the computer system receives, from a first user device (e.g., the initiating device such as a voice-controller device (VCD)), a user request (e.g., audio data representing a user utterance) for communications with a second user device (e.g., the recipient device such as another VCD). In an example, the caller operates the initiating device and provides the user utterance indicating a type of communications with the contact (e.g., "Alexa, drop in on Alice"). Upon detecting the wakeword, the initiating device generates and sends the audio data to the computer system, where the audio data represents the user utterance. In another example, no user utterance is provided. Instead, the caller provides manual input at a user interface of the initiating device explicitly selecting the contact based on contact data presented at the user interface and requesting the type of communications (e.g., by performing touchscreen input that "Alice" and a "Drop In" from a contacts list of the caller). In this case, the user request explicitly identifies the contact and the type of communications.

At operation 904, the computer system determines an identifier of the second user device and a requested type of a communications session (e.g., a synchronous audio communications session that should be automatically established). In an example, when the user request explicitly identifies the contact and the type of communications, the computer system uses the contact's identifier to determine the recipient device's identifier and sets the requested type of the communications session to the type of communications (e.g., a requested synchronous audio communications session that should be automatically established corresponding to a Drop In). Determining the recipient device's identifier can include looking up the caller's user account to find a match between the contact's identifier and the caller's contacts list and determining the recipient device's identifier corresponding to the match. In another example, the user request includes audio data. In this example, ASR and NLU processing can be performed to determine the recipient device's identifier and the requested type of the communications session as further described herein below in connection with operations 906-910. In particular, operations 906-910 can be implemented as sub-operations of operation 904.

At operation 906, the computer system generates text data representing the audio data. In an example, a natural language processing system of the computer system generates the text data by performing ASR processing on the audio data.

At operation 908, the computer system determines a second user (e.g., identifies a targeted contact) and that a request was made for the type of communications session based on the text data. In an example, the language processing system performs NLU processing on the text data and determines that the intent of the user utterance was to start a Drop In and that the intended target is "Alice" (e.g., {Start Communications Session}: Drop In; Contact Name}: Alice).

At operation 910, the computer system determines the recipient device's identifier from a contacts list included in a user account of a first user (e.g., the caller's sure account) associated with the first user device. In an example, the computer system looks up the caller's user account to find a match between the contact as determined under operation 908 and the caller's contacts list and determines the recipient device's identifier corresponding to the match. If multiple device identifiers are determined, the communications system can use presence information to select the recipient device's identifier from such identifiers.

At operation 912, the computer system sends, to the first user device, instructions about establishing the communications session of the requested type. In an example, the computer system determines, from a user account of the caller, a preset permission that allows the requested type of the communications session. In addition, the computer system determines a network address of the recipient device and route data for routing data between the initiating device and the recipient device. Given the permission, the computer system sends the instructions, where these instructions include the network address of the recipient device and the routing data.

At operation 914, the computer system receives, from the second user device, event data indicating that the communications session was requested from the first user device. In an example, upon the instructions to establish the communications session, the initiating device sends a request for the synchronous audio communications session to the recipient device. In response, the recipient device inquires the computer system whether to accept this request, where the inquiry includes an identifier of the initiating device and is sent as the event data.

At operation 916, the computer system generates content associated with the first user device (e.g., TTS content for an announcement including information about the caller or the initiating device to the contact). In an example, the computer system determines, based on the identifier of the initiating device and an identifier of the recipient device, that the recipient device should accept the request of the initiating device for the synchronous audio communications session based on the previous instructions sent to the initiating device about establishing this requested type of communications session with the recipient device. In parallel to, prior to, or after performing this determination, the computer system also generates the content by identifying the initiating party based on the identifier of the initiating device. The initiating party can include any of the caller and/or the initiating device. A process for identifying the initiating party and generating the content is further illustrated in connection with FIG. 10. Generally, the content can be TTS content stored as a file in a data store, where the TTS content identifies the initiating party and explains that a Drop In was established and is ongoing with the initiating party.

At operation 918, the computer system sends, to the second user device, instructions about accepting the communications session. In an example, the instructions direct the recipient device to accept the request of the initiating device and establish the synchronous audio communications session.

At operation 920, the computer system sends, to the second user device, instructions about presenting the content (e.g. streaming the TTS content) after the communications session is established. In an example, the instructions under this operation and the instructions from operation 918 can be combined in a same set of instructions, such as a directive, sent to the recipient device. The instructions here direct the recipient device about how to present the content and about whether the presentation of inbound data to the recipient device in the communications session and/or the transmission of outbound data from the recipient device in the communications session should paused or not while the content is being presented. For instance, the instructions can include a set of parameters identifying the URL of the TTS content, requesting this TTS content to be streamed, and pausing the presentation of the inbound data and the transmission of outbound data as applicable.

FIG. 10 illustrates an example flow for generating content associated with announcing a communications session, in accordance with various embodiments. The example flow may be performed as sub-flow of operation 916 of the example flow of FIG. 9. In FIG. 10, a first user and a first user device are described in connection with a caller and an initiating device. In addition, a second user and a second user device are described on connection with a contact and a recipient device.

Announcing information about an initiating party can include announcing a name of the caller (referred to herein as a "user name"), a name of the initiating device (referred to herein as a "device name"), a name of a space associated with the initiating device (referred to herein as a "space name"), and/or a generic name of an account under which the initiating device is registered (referred to herein as a "generic account name"). Whether to use the user name, device name, space name, and/or generic account name can depend on a number of factors that relate, for instance, to device registration.

In an example, a user account includes a registration of multiple user devices and is referred to herein as a "group account." The group account can have a generic account name and stores a device name for each of such user devices. In addition, each of the user devices need not but can be shared between multiple users, each of which has a user account stored under the group account (such user accounts are referred to herein as "individual accounts"). An individual account stores a user name of the associated user. Further, the registration of a user device in a group account and/or an individual account can identify a space where the user device is located. In this case, the group account and/or the individual account store a space name of this location.

To illustrate, consider the following scenarios. The announcement of the initiating party can vary depending on the scenario. In a first scenario, the initiating device and the recipient device belong to a same group account, such as an account set-up for a family. The initiating device is registered, under the group account, as "Device XYZ" installed in the "Basement." Under this scenario, a Drop In from the initiating device to the recipient device is similar to an automatically answered intercom between the two user devices. Under this scenario, the announcement identifies an incoming Drop In from the Basement (e.g., "a Drop In has been initiated from the Basement"). In a second similar scenario, the group account does not store information about the space (e.g., the "Basement."). Under this scenario, the announcement identifies initiating device instead of its space (e.g., "a Drop In has been initiated from Device XYZ"). In yet another scenario, the initiating device and the recipient device do not belong to a same group account. Under this scenario, a Drop In from the initiating device to the recipient device is similar to an automatically answered audio call between the two user devices. Under this scenario, the initiating device along with other user devices (but not the recipient device) belong to a group account of the caller and these user devices are shared among multiple individual account. This group account can be associated with a generic account name (e.g., "Bob's family account"). Accordingly, the announcement identifies an incoming Drop In from a generic account name (e.g., "a Drop In has been initiated from Bob's family account"). In a fourth similar scenario of external communications, the initiating device belong to the group account (as in the third scenario) but is not shared with multiple individual accounts (e.g., it is registered under one particular user account from the group account, such as Bob's individual account). Under this scenario, the announcement identifies an incoming Drop In from a generic account name of the individual account (e.g., "a Drop In has been initiated from Bob's individual account"). In yet another scenario of external communications, the initiating device does not belong to a group account and, instead, is registered under only one individual user account. Under this scenario, a user name corresponding to the individual may be used, whereby the announcement identifies the individual (e.g., "a Drop In has been initiated by Bob"). Identifying the initiating party and generating the corresponding TTS content is further described in connection with the next operations of the flow of FIG. 10.

In an example, the flow of FIG. 10 starts at operation 1002, where the computer system determines a first identifier of a first user device (e.g., the initiating device) and a second identifier of a second user device (e.g., the recipient device). In an example, upon a request for a synchronous communications session (e.g., for a Drop In) from the initiating device, the recipient device sends event data to the computer system. The event data includes the first identifier and the second identifier.

At operation 1004, the computer system determines whether the first user device and the second user device are registered under a same group account based on the first identifier and the second identifier. In an example, and in response to receiving the event data from the recipient device, the computer system accesses a user account based on the second identifier of the recipient device. The computer system determines whether the first identifier is stored in this user account. If so, the two user devices belong to the same group account and operation 1010 may follow operation 1004. Otherwise, the two user devices do not belong to the same group account and operation 1020 may follow operation 1004.

At operation 1010, the computer system determines whether the first user device is associated with a space. In an example, the computer system accesses the registration information of the initiating device from the group account and determines whether the registration information includes (e.g., in a registration field) a name of a space where the device is located or installed. If the space name is available from the registration information, operation 1012 may follow operation 1010. If the space name is unavailable from the registration information, operation 1014 may follow operation 1010.

At operation 1012, the computer system sets an initiating party to the space name based on the registration information. In an example, the computer system defines the initiating party as being the space name (e.g., {Initiating Party}: Space Name). In another example, the computer system uses this definition only if the original audio data received from the initiating device requested a Drop In to a space name. For instance, if the space name of the initiating device is "Basement" and the space name of the recipient device is "Kitchen," the computer system sets the initiating party to "Basement" if the audio data was for "Drop In on the Kitchen." Otherwise, the computer system sets the initiating party to the device name of the initiating device (e.g., "Device XYZ"), where this device name is stored under the group account. Additionally or alternatively, the computer system may match the audio data with voice biometric data stored under the group account. This voice biometric data corresponds to an individual having a user name under the group account (e.g., "Bob"). The match identifies the user name and, accordingly, the computer system sets the initiating party to the user name.

At operation 1014, the computer system determines sets the initiating party to a device name based on the registration information lacking the space information. In an example, the computer system accesses the device name from the group account and defines the initiating party as being the device name (e.g., {Initiating Party}: Device Name). Here also, the computer system may additionally or alternatively use the biometric data such that the initiating party can include the user name.

At operation 1020, the first user device and the second user device do not belong to the same group account. At this operation, the computer system determines whether the first user device belongs to its own group device. In an example, the computer system finds and accesses a user account based on the first identifier of the initiating device. The computer system determines whether this user account stores one or more identifiers of one or more other user devices. If so, the computer system determines that the initiating device belongs to a group account (which is different from the recipient device's user account) and operation 1022 may follow operation 1020. Otherwise, the e computer system determines that the initiating device belongs to an individual account (which is also different from the recipient device's user account) and operation 1024 may follow operation 1020.

At operation 1022, the computer system determines whether the first user device is shared between multiple individual accounts of the group account. In an example, the group account stores associations between each of the user devices and the individual accounts. Accordingly, based on the first identifier, the computer system determines whether the initiating device is associated with multiple individual accounts or not. If associated with multiple individual accounts, the initiating device is shared between these individual accounts and operation 1024 may follow operation 1022. If associated with only one individual account, the initiating device is specific to that user account and operation 1026 may follow operation 1022.

At operation 1024, the initiating device is shared between multiple individual accounts. Accordingly, the computer system sets the initiating party to a generic account name of the group account. In an example, the generic account name can be stored under the group account and the computer system defines the initiating party as being the generic account name (e.g., {Initiating Party}: Generic Account Name). In another example, and similarly to the description above in connections with operation 1012 and 1014, the computer system can also determine a space name of the initiating device, a device name of the initiating device, and/or a user name of a user of the initiating device (e.g., the caller) and can additionally or alternatively user the space name, device name, and/or the user name as the initiating party. In such scenarios, permissions to share the space name, device name, and/or user name for communications with devices not belonging to the group name (e.g., with the initiating device) can control the use of this information. Such permissions can be stored under the group account and/or the individual user accounts.

At operation 1026, the computer system sets the initiating party to a user name. In an example, the user name is stored under the individual account. In another example, the computer system looks up a contacts list stored in the user account under which the recipient device is registered (e.g., the callee's contacts list) and determines a match between the first identifier of the initiating device and an identifier of a user device in the contact list. The match identifier the user name (e.g., as stored by the callee under their contacts list). In both examples, the computer system defines the initiating party as being the user name (e.g., {Initiating Party}: User Name). Here also, the computer system can also determine and use the space name and/or device name associated with the initiating device depending on the permissions.

At operation 1030, the computer system generates TTS content that includes the information about the initiating party. In an example, the computer system uses a text-to-speech synthesizer to generate the TTS content.

At operation 1040, the computer system stores the TTS content as a file in a data store. In an example, the network location where the TTS content is stored is accessible to the second user device such that this device can stream the TTS content.

FIG. 11 illustrates an example flow for responding by the recipient device to a request of the initiating device for the communications session, in accordance with various embodiments. As illustrated, the example flow starts at operation 1102, where the recipient device receives, from a first user device (e.g., the initiating device), a request to establish a communications session with the first user device. In an example, the request is for a particular type of the communications session (e.g., a synchronous audio communications session) and is sent from the initiating device based on the instructions of the computer system.

At operation 1104, the recipient device sends, to the computer system, an indication of the request. In an example, the recipient device sends event data to the computer system. The event data indicates that the particular type of the communications session was requested and includes an identifier of the initiating device.

At operation 1106, the recipient device receives, from the computer system, instructions to accept the request and present content after the communications session of the particular type is established. In an example, the instructions include a set of parameters controlling the timing of the presentation (e.g., immediately after establishing the communications session, immediately after playing a chime following the establishing of the communications session, etc.). The instructions also include a set of parameters controlling the presentation of the content and inbound data and the transmission of outbound data.

At operation 1108, the recipient device presents the content after the communications session is established with the first user device. In an example, the instructions includes a URL of the content and the recipient device streams the content from the corresponding network location for presentation at a speaker of the recipient device.

At operation 1110, the recipient device manages a presentation of the inbound data from the first user device (e.g., the initiating device) and a transmission of the outbound data to the user device while the content is presented. In an example, the instructions specify whether the inbound data received while the content is being presented should be also presented to the caller or not. The instructions also specify whether the outbound data detected by a microphone of the recipient device while the content is being presented should be also transmitted to the initiating device. As illustrated in connection with FIGS. 4-6, the recipient device can present the content while the presentation of the inbound data and the transmission of the outbound data are paused, can present the content and the inbound data simultaneously while the transmission of the outbound data is paused, or can present the content and the inbound data and transmit the outbound data simultaneously.

At operation 1112, the recipient device presents inbound data after the content is presented. In an example, once the streaming is complete and upon receiving inbound data in the communications session from the initiating device thereafter, the recipient device presents the inbound data at the speaker.

At operation 1114, the recipient device sends outbound data after the content is presented. In an example, once the streaming is complete and upon detecting outbound data by a microphone of the recipient device thereafter, the recipient device sends the outbound data in the communications session to the initiating device.

In various embodiments of the present disclosure, a user has control over user-related information that can be collected and analyzed. Depending on the type of user-related information, appropriate measures are taken to ensure protection of this information, to empower the users to determine what data can be collected and analyzed, as well as empower the users to indicate which portions of the information should be deleted and/or no longer collected and/or analyzed. Further, the user has control over opting in to the communications services described herein and, if opted in, to opt out at any time. The features provided by the communication services are compliant with the applicable regulations. For instance, if a legal authority requires identifying an initiating party, techniques described herein are used to be in compliance.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer storage media comprising instructions that, upon execution on a computer system, cause the computer system to perform operations comprising:
    sending, to a first user device, first data to establish a synchronous audio communications session with a second user device;
    generating, prior to establishing the synchronous audio communications session with the first user device and the second user device, audio data, the audio data generated based at least in part on a first account associated with the first user device and a second account associated with the second user device;
    sending, to the second user device, second data to accept a request for the synchronous audio communications session from the first user device, the synchronous audio communications session established without manual user input at the second user device in response to the request; and
    sending, to the second user device, third data to present by the second user device the audio data after the synchronous audio communications session is established with the first user device.

2. The or more non-transitory computer storage media of claim 1, comprising further instructions that, upon execution on the computer system, cause the computer system to perform additional operations comprising: receiving, from the second user device, event data that includes a uniform resource locator (URL) of the audio data at a network address, wherein the third data instructs the second user device to pause a presentation of inbound audio data to the second user device in the synchronous audio communications session and to pause a transmission of outbound audio data from the second user device in the synchronous audio communications session while streaming the audio data.

3. The or more non-transitory computer storage media of claim 1, comprising further instructions that, upon execution on the computer system, cause the computer system to perform additional operations comprising:
 determining that a group account includes a first identifier associated with the first user device and a second identifier associated with the second user device;
 determining that the first user device and the second user device belong to the group account;
 determining, from the group account, a name of a space associated with the first user device; and
 setting an initiating party to the name of the space, wherein the audio data identifies the initiating party.

4. A computer system, comprising:
 one or more processors; and
 one or more memories storing computer-readable instructions that, upon execution by the one or more processors, cause the computer system to:
  send first data to a first user device to establish a communications session with a second user device;
  generate, prior to the communications session being established with the first user device and the second user device, content data based at least in part on a first account associated with the first user device and a second account associated with the second user device;
  send, to the second user device, second data to accept a request for the communications session from the first user device, the communications session established without manual user input at the second user device in response to the request; and
  send, to the second user device, third data to present the content data by the second user device after the communications session is established with the first user device and the second user device.

5. The computer system of claim 4, wherein the execution of the computer-readable instructions further cause the computer system to prior to the communications session being established:
 receive, from the second user device, a first identifier of the first user device and a second identifier of the second user device;
 determine that the first user device and the second user device belong to a same user account based at least in part on the first identifier and the second identifier;
 determine that a name of a space is unavailable for the first user device from the user account;
 determine a device name of the first user device from the user account; and
 set an initiating party to the device name, wherein the content data comprises an identifier of the initiating party, and wherein the third data instructs the second user device to present the identifier after the communications session is established.

6. The computer system of claim 4, wherein the execution of the computer-readable instructions further cause the computer system to prior to the communications session being established:
 receive, from the second user device, a first identifier of the first user device and a second identifier of the second user device;
 determine, based at least in part on the first identifier and the second identifier, that the first user device belongs to a user account and that the second user device belongs to a different user account;
 determine that multiple user devices belong to the user account;
 determine a name of the user account; and
 set an initiating party to the name of the user account, wherein the content data comprises an identifier of the initiating party, and wherein the third data instructs the second user device to present the identifier after the communications session is established.

7. The computer system of claim 4, wherein the execution of the computer-readable instructions further cause the computer system to prior to the communications session being established:
 receive, from the second user device, a first identifier of the first user device and a second identifier of the second user device;
 determine, based at least in part on the first identifier and the second identifier, that the first user device belongs to the first account and that the second user device belongs to the second account that is different from the first account;
 determine that no other user device belongs to the first account;
 determine a name of a user associated with the first user device; and
 set an initiating party to the name of the user, wherein the content data comprises an identifier of the initiating party, and wherein the third data instructs the second user device to present the identifier after the communications session is established.

8. The computer system of claim 4, wherein the execution of the computer-readable instructions further cause the computer system to:
 receive, from the second user device, event data indicating the request for the communications session, wherein the content data is received after receiving the first data and prior to receiving the event data.

9. The computer system of claim 4, wherein the execution of the computer-readable instructions further cause the computer system to:
 receive, from the second user device, event data indicating the request for the communications session, wherein the content data is received after receiving the event data and prior to sending the second data.

10. The computer system of claim 4, wherein the third data instructs the second user device to pause a presentation of inbound data of the first user device in the communications session while presenting the content data.

11. The computer system of claim 4, wherein the third data instructs the second user device to pause a transmission of outbound data from the second user device in the communications session while presenting the content data.

12. The computer system of claim 4, wherein the execution of the computer-readable instructions further cause the computer system to:
 receive, from the first user device, audio data representing an utterance of a first user associated with the first user device for communications with a second user associated with the second user device; and
 determine, based at least in part on the audio data, the second user and a requested type of the communications session, the requested type being a synchronous audio communications session that should be established without a user action to manually accept the synchronous audio communications session, wherein the first user device is instructed to establish the requested type.

13. The computer system of claim 12, wherein the execution of the computer-readable instructions further cause the computer system to:
  determine an identifier of the second user device based at least in part on the second user and a contacts list associated with the first account of the first user, wherein the first user device is a first voice-controlled device (VCD) and is instructed to establish the synchronous audio communications session with the second user device based at least in part on the identifier, and wherein the second user device is a second VCD.

14. One or more non-transitory computer storage media comprising instructions that, upon execution on a computer system, cause the computer system to perform operations comprising:
  sending first data to a first user device to establish a communications session with a second user device;
  generating, prior to the communications session being established with the first user device and the second user device, content data based at least in part on a first account associated with the first user device and a second account associated with the second user device;
  sending, to the second user device, second data to accepting a request for the communications session from the first user device, the communications session established without manual user input at the second user device in response to the request; and
  sending, to the second user device, third data to present the content data by the second user device after the communications session is established with the first user device and the second user device.

15. The one or more non-transitory computer storage media of claim 14, wherein the third data instructs the second user device to:
  pause a presentation of inbound data from the first user device in the communications session while presenting the content data; and
  pause a transmission of outbound data from the second user device in the communications session while presenting the content data.

16. The one or more non-transitory computer storage media of claim 15, wherein the content data identifies at least one of: a user of the first user device, a space where the first user device is located, a name of the first user device, or the first account associated with the first user device.

17. The one or more non-transitory computer storage media of claim 14, wherein the third data instructs the second user device to:
  present inbound data from the first user device in the communications session while presenting the content data; and
  pause a transmission of outbound data from the second user device in the communications session while presenting the content data.

18. The one or more non-transitory computer storage media of claim 14, wherein the third data instructs the second user device to:
  present inbound data from the first user device in the communications session while presenting the content data; and
  send, while presenting the content data, outbound data from the second user device in the communications session to the first user device.

19. The one or more non-transitory computer storage media of claim 18, wherein the third data instructs the second user device to:
  input the inbound data and the content data as a reference signal to a noise canceling process, wherein the outbound data is an output of the noise canceling process.

20. The one or more non-transitory computer storage media of claim 1, wherein the audio data indicates a caller associated with the first user device, and wherein the third data indicates a timing between a presentation, by the second user device, of the audio data and a presentation, by the second user device, of inbound data to the second user device from the first user device in the synchronous audio communications session.

* * * * *